US011602420B2

(12) United States Patent
Kwan et al.

(10) Patent No.: US 11,602,420 B2
(45) Date of Patent: Mar. 14, 2023

(54) METHOD FOR SIMULTANEOUSLY INSTALLING A MONOLITHIC DENTAL PROSTHESIS ON MULTIPLE DENTAL IMPLANTS

(71) Applicants: Norman Ho Kwong Kwan, St. Catherine's (CA); Jan Chung Kwan, Beamsville (CA)

(72) Inventors: Norman Ho Kwong Kwan, St. Catherine's (CA); Jan Chung Kwan, Beamsville (CA)

( * ) Notice: Subject to any disclaimer, the term of this patent is extended or adjusted under 35 U.S.C. 154(b) by 208 days.

(21) Appl. No.: 16/685,774

(22) Filed: Nov. 15, 2019

(65) Prior Publication Data

US 2020/0155281 A1 May 21, 2020

Related U.S. Application Data

(63) Continuation of application No. 15/344,812, filed on Nov. 7, 2016, now abandoned, which is a
(Continued)

(51) Int. Cl.
*A61C 13/00* (2006.01)
*A61C 8/00* (2006.01)
*A61C 9/00* (2006.01)

(52) U.S. Cl.
CPC .......... *A61C 13/0004* (2013.01); *A61C 8/006* (2013.01); *A61C 8/008* (2013.01);
(Continued)

(58) Field of Classification Search
CPC ....... A61C 8/005; A61C 8/006; A61C 8/0018; A61C 8/0054; A61C 8/0066; A61C 8/0069
(Continued)

(56) References Cited

U.S. PATENT DOCUMENTS 5,281,140 A * 1/1994 Niznick .................. A61C 8/005
433/172
5,338,197 A 8/1994 Kwan
(Continued)

FOREIGN PATENT DOCUMENTS

EP 1269932 A1 * 1/2003 ............. A61C 8/005
EP 2218423 A1 * 8/2010 ......... A61C 13/0004
(Continued)

OTHER PUBLICATIONS

Branemark System; Product Catalog 3rd Edition; 1996; Nobelpharma AB.

*Primary Examiner* — Edward Moran
*Assistant Examiner* — Matthew P Saunders
(74) *Attorney, Agent, or Firm* — Peter J. Mikesell; Schmeiser, Olsen & Watts, LLP

(57) ABSTRACT

A dental implant assembly containing an integrally-formed universal abutment which has a top section, a bottom section integrally joined to the top section, and a passageway extending through these sections. The passageway is formed by different size bores, initially a larger size than decrease in size. The top section of the abutment has a cross-sectional shape substantially like a polygon; the shape is formed by alternating linear and arcuate walls joining to a bottom section having a cross-sectional shape substantially like a polygon.

14 Claims, 21 Drawing Sheets

Related U.S. Application Data continuation-in-part of application No. 13/959,161, filed on Aug. 5, 2013, now abandoned.

(52) U.S. Cl.
CPC .......... *A61C 8/0051* (2013.01); *A61C 8/0068* (2013.01); *A61C 9/0053* (2013.01); *A61C 8/0001* (2013.01)

(58) Field of Classification Search
USPC .............................................. 433/173–201.1
See application file for complete search history.

(56) References Cited

U.S. PATENT DOCUMENTS

| | | | | |
|---|---|---|---|---|
| 5,564,924 A * | 10/1996 | Kwan | ................... | A61C 8/0001 433/173 |
| 5,571,017 A | 11/1996 | Niznick | | |
| 5,733,124 A * | 3/1998 | Kwan | ................... | A61C 8/0024 433/173 |
| 5,947,735 A | 9/1999 | Day | | |
| 6,068,479 A * | 5/2000 | Kwan | ................... | A61C 8/0001 433/173 |
| 6,217,331 B1 | 4/2001 | Rogers et al. | | |
| 6,280,191 B1 | 8/2001 | Gordon | | |
| 6,527,554 B2 | 3/2003 | Hurson et al. | | |
| 6,788,986 B1 | 9/2004 | Traber et al. | | |
| 7,207,800 B1 * | 4/2007 | Kwan | ................... | A61C 8/0001 433/173 |
| 8,038,442 B2 | 10/2011 | Hurson | | |
| 8,272,871 B2 * | 9/2012 | Hurson | ................ | A61C 8/0066 433/173 |
| 8,500,449 B2 | 8/2013 | Kwan | | |
| 2002/0168614 A1 * | 11/2002 | Riley | ................. | A61C 13/0835 433/218 |
| 2002/0182567 A1 | 12/2002 | Hurson et al. | | |
| 2006/0078847 A1 * | 4/2006 | Kwan | ................... | A61C 8/0001 433/174 |
| 2006/0110706 A1 * | 5/2006 | Jorneus | ................... | A61C 8/005 433/173 |
| 2007/0111162 A1 * | 5/2007 | Laux | ..................... | A61C 8/0048 433/173 |
| 2007/0141531 A1 | 6/2007 | De Clerk | | |
| 2008/0241789 A1 | 10/2008 | Mundorf | | |
| 2008/0241794 A1 | 10/2008 | Urata et al. | | |
| 2008/0261176 A1 * | 10/2008 | Hurson | ................. | A61C 8/0069 433/174 |
| 2009/0075235 A1 * | 3/2009 | Letcher | ................. | A61C 8/0048 433/173 |
| 2010/0304334 A1 * | 12/2010 | Layton | ................ | A61C 13/0004 433/173 |
| 2011/0136080 A1 * | 6/2011 | Holzner | .................... | A61C 5/77 433/201.1 |
| 2011/0229851 A1 * | 9/2011 | Tuinenburg | .......... | A61C 8/0048 433/173 |
| 2012/0264082 A1 * | 10/2012 | Segura | ................. | A61C 8/0048 433/174 |
| 2014/0011155 A1 * | 1/2014 | Thomsen | ............. | A61B 5/0062 433/29 |
| 2014/0205969 A1 * | 7/2014 | Marlin | ................. | A61C 8/0068 433/196 |
| 2015/0037757 A1 * | 2/2015 | Kwan | ................. | A61C 13/0004 433/174 |
| 2015/0313694 A1 * | 11/2015 | Piasini | ..................... | A61C 5/70 433/173 |

FOREIGN PATENT DOCUMENTS

KR             101417980 B1 *   4/2014
WO     WO-2012158769 A1 * 11/2012   ......... A61C 13/0001

* cited by examiner

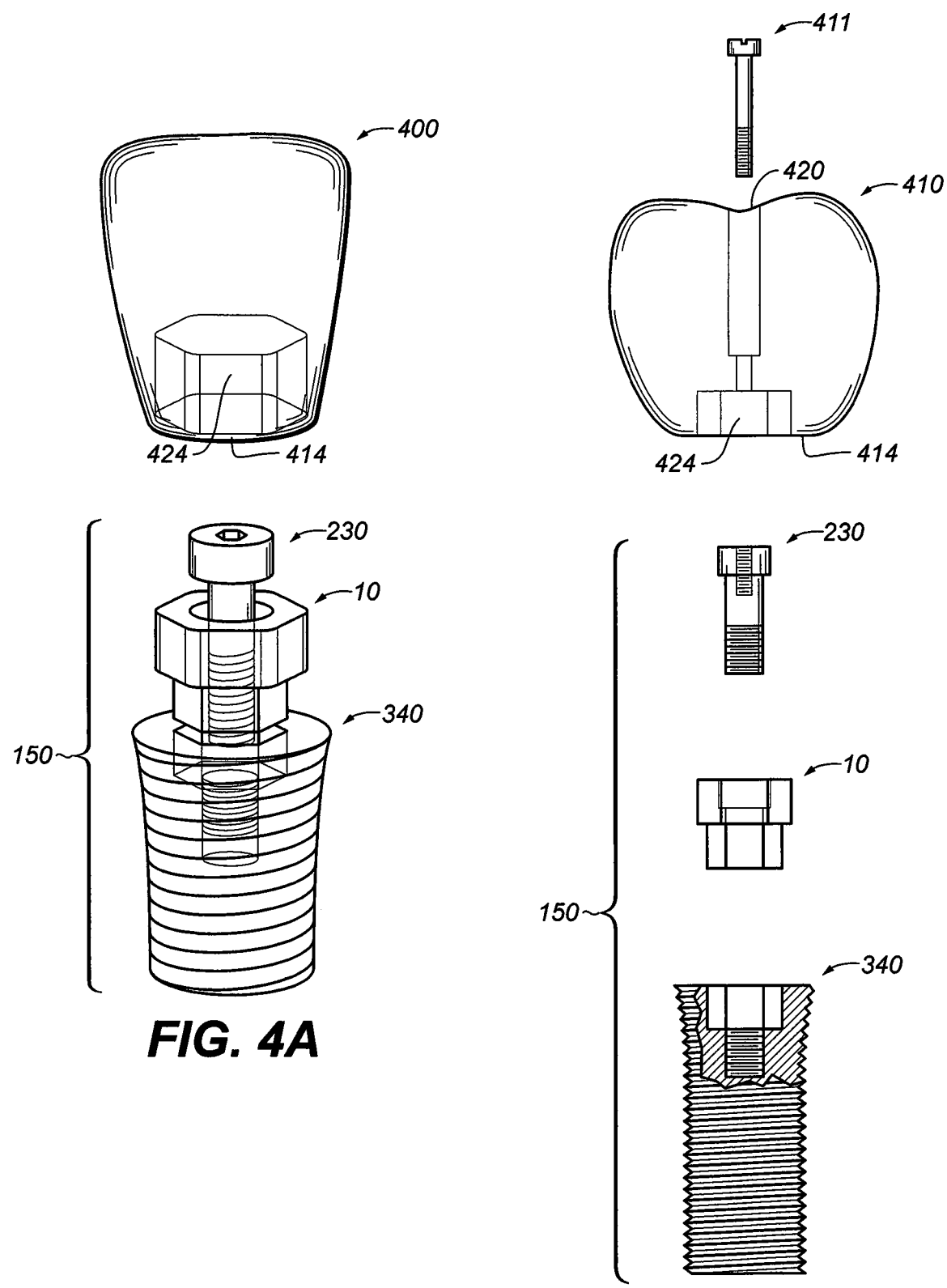

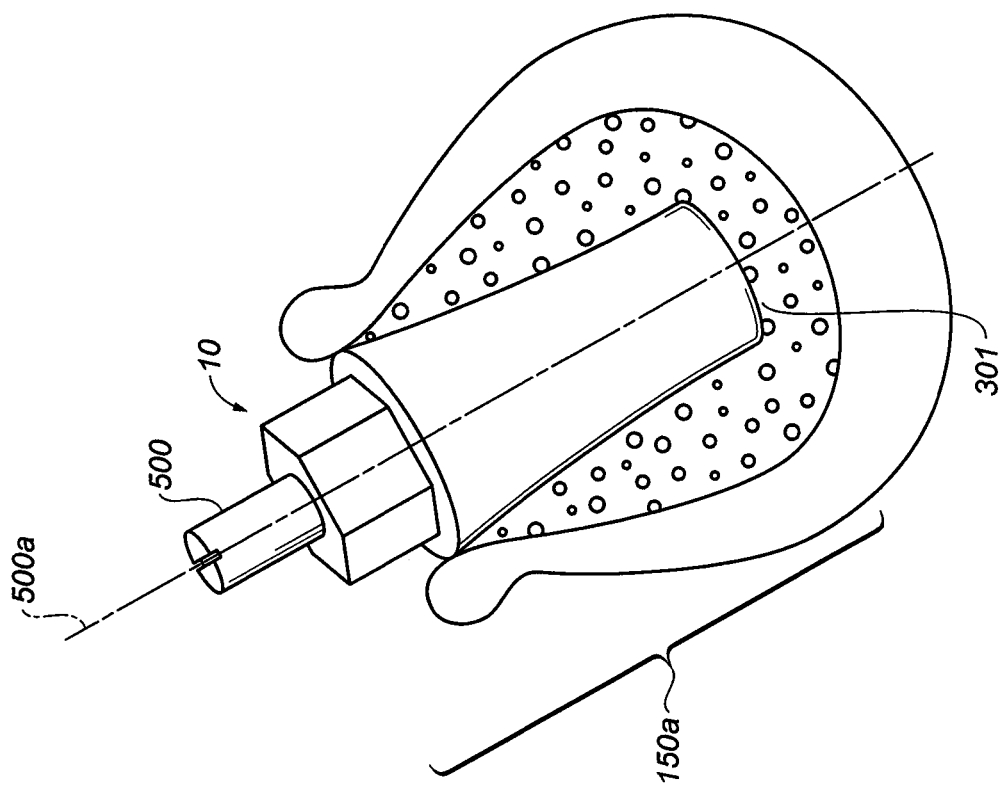
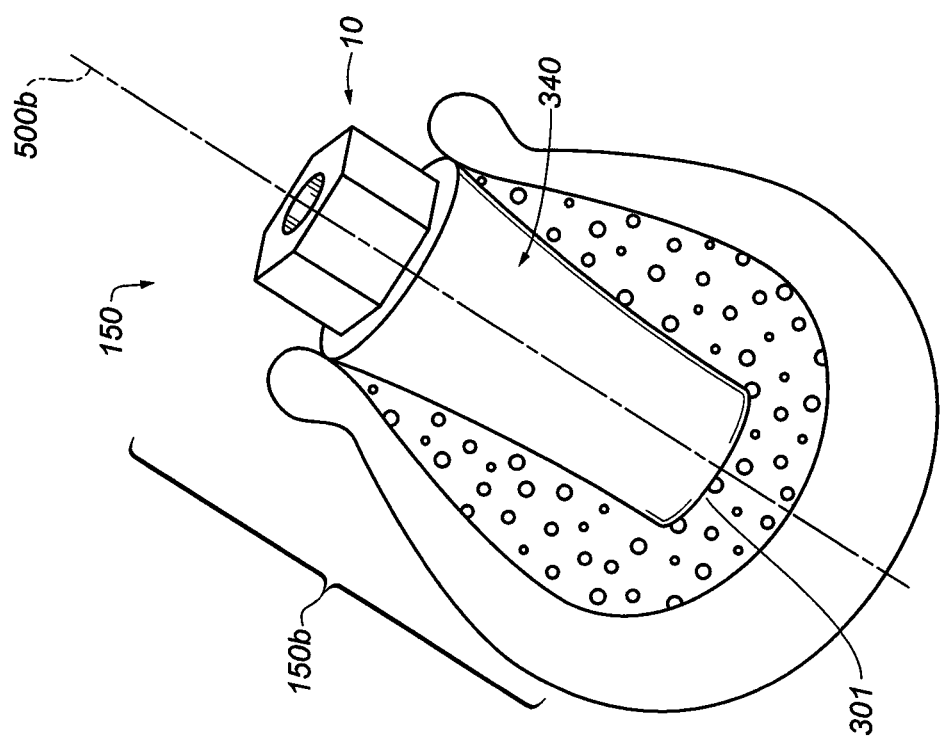
FIG. 5B

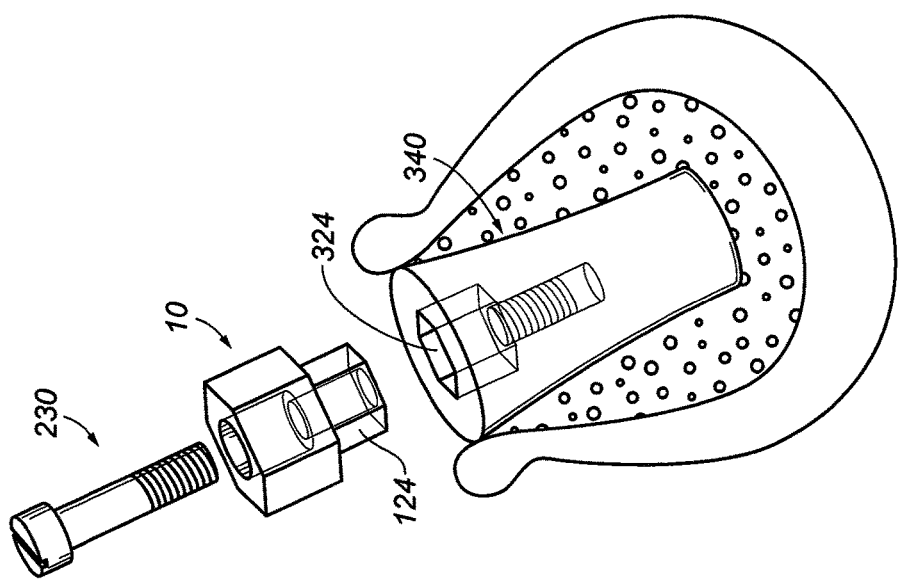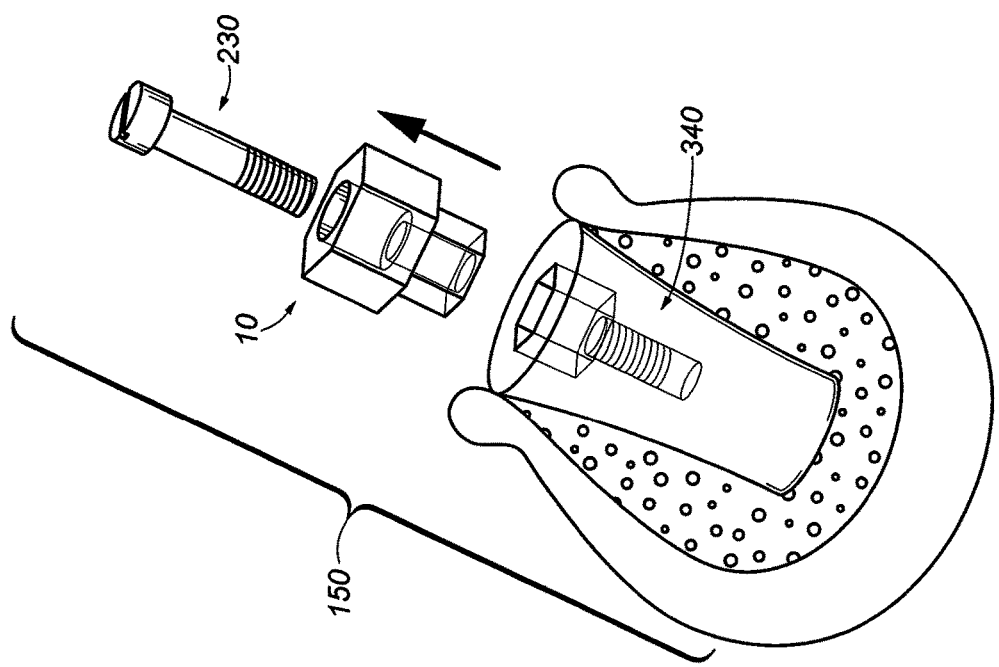
FIG. 5C

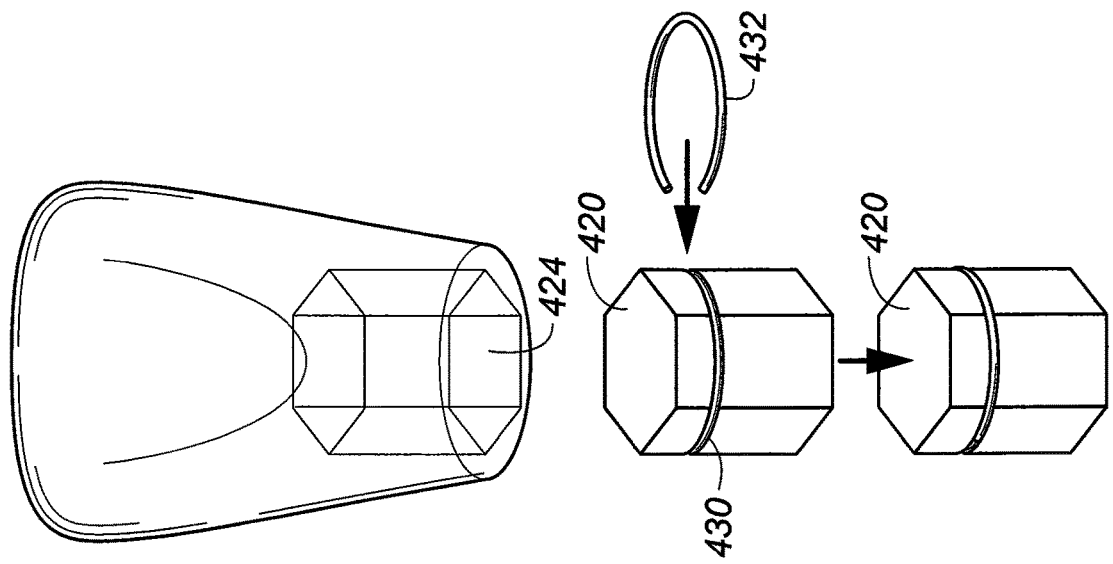
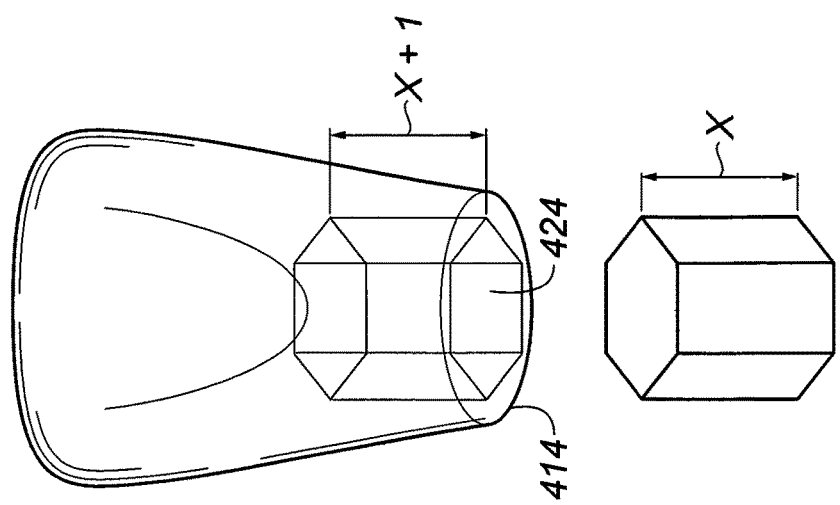
FIG. 6B

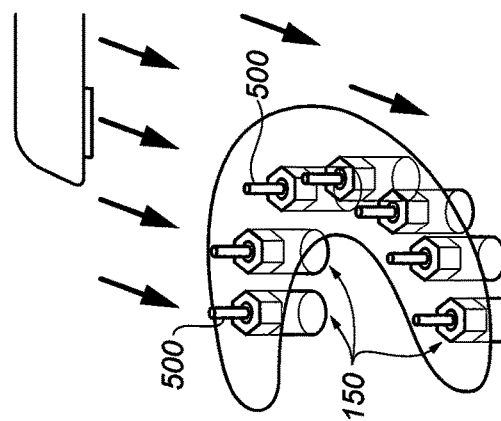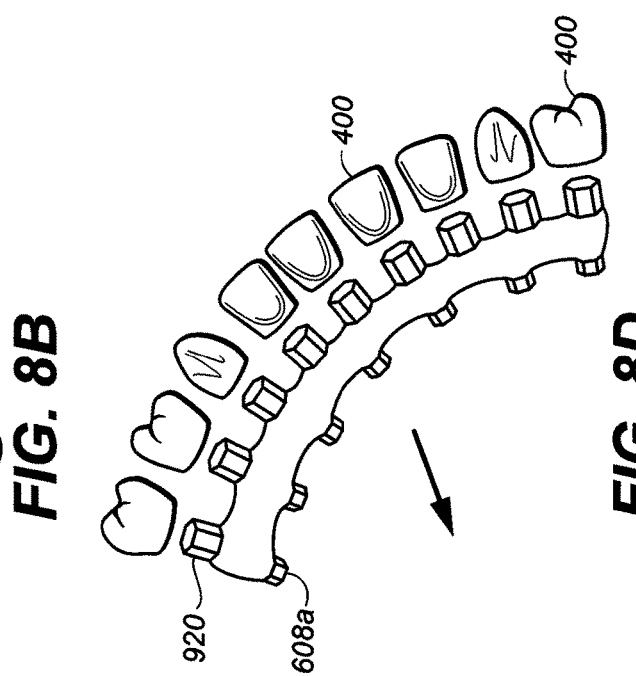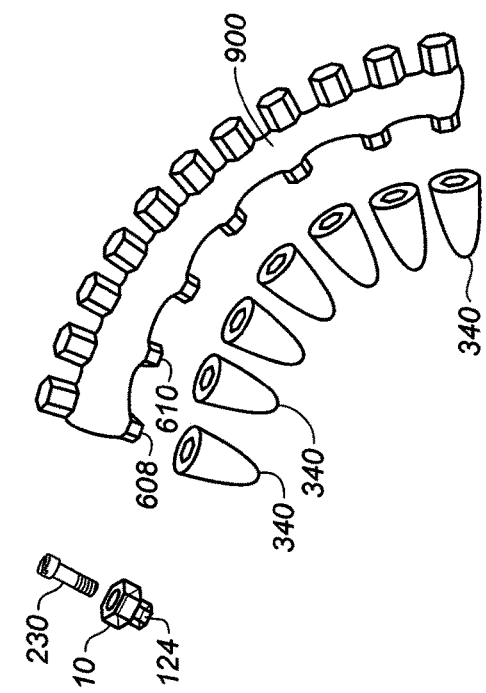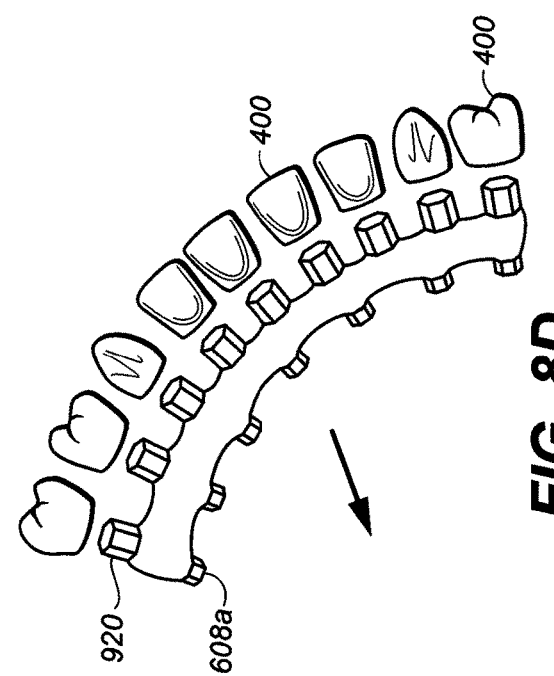

METHOD FOR SIMULTANEOUSLY INSTALLING A MONOLITHIC DENTAL PROSTHESIS ON MULTIPLE DENTAL IMPLANTS

CROSS-REFERENCE TO RELATED APPLICATIONS

This application is a continuation of U.S. patent application Ser. No. 15/344,812 (filed Nov. 7, 2016) which is a continuation-in-part of U.S. patent application Ser. No. 13/959,161 (filed Aug. 5, 2013), the entirety of which are incorporated herein by reference.

BACKGROUND OF THE INVENTION

Dental implants have been known and used since at least the 1930's. See, for example, U.S. Pat. No. 5,312,254 of Joel L. Rosenlicht. See also U.S. Pat. No. 5,145,371 of Lars Jorneus which discusses the osseointegration method of integrating a dental implant into a patient's jaw. The disclosure of each of these patents is hereby incorporated by reference into this specification.

Dental implants are moderately expensive. It often costs from about three to four thousand dollars to implant a tooth into a patient's mouth. One of the reasons for this substantial cost is the multiplicity of steps required by the implant procedure. These steps will be described below with reference to Nobelpharma catalog PRI 385 B 95.09 3rd edition (published by the Nobelpharma AB, Box 5190, S-402 26 Goteborg, Sweden).

In the first step of the procedure, an implant (sometimes referred to as a "fixture") is purchased. See, for example, page 7 of the Nobelpharma catalog and the reference to the 3.75 mm and 4.0 mm titanium fixtures illustrated on such page.

The fixture is placed into an "instrument set for fixture placement", which is shown on page 26 of the Nobelpharma catalog. Once the fixture is disposed in the "instrument set" a "fixture mount" is then attached to the fixture by means of a wrench and a screwdriver. The "fixture mount" devices are shown on page 26 of the Nobelpharma catalog. The instruments for fixture placement of the fixture are also shown on page 26 of the Nobelpharma catalog (see wrench part 14 and screwdriver part 16).

Thereafter, a "connection to contra-angle handpiece" (see part DEC330 on page 52 of the Nobelpharma catalog) is attached to a handpiece; and the implant assembly may then be driven into the jawbone of a patient. Thereafter, the fixture mount is removed from the fixture and a cover screw (see page 9 of the Nobelpharma catalog) is inserted into the fixture. Thereafter, the surgical site is allowed to heal for from about 3 to about 6 months. See, e.g., Branemark/Zarb/Alberektsson: "Tissue Integrated Prostheses" (Quintessence Books, 1985).

After the healing period, the implant is exposed by surgical procedures and the cover screw is removed. Thereafter, a healing abutment (see part SCPB010 on page 12 of the Nobelpharma catalog) is attached to the fixture. It generally is left in place for from about two to about three weeks, depending upon how the patient's tissue has healed. Thereafter, the healing abutment is removed and an implant abutment is then attached to the fixture. The type of implant abutment to be used will depend on the requirements of the patient. Thus, e.g., and referring to pages 14 to 16 of the Nobelpharama catalog, one may standard abutment, and ESTHETICONE™ abutment, a CERAONE™ abutment, a "Ball Attachment", an "Angulated Abutment", and the like. After multiple visits, the desired single crown is formulated by conventional means. Once the prosthesis has been prepared, it is custom fitted to the patient's mouth secured to the implant.

This traditional dental restorative procedure require considerable skill and expertise. Typically, the procedure and the components used for each patient are highly customized. Independent placement of the implant requires selection of an appropriate abutment from hundreds of different options. Essentially, the abutment is selected to both compensate for implant placement inaccuracies and to address the final aesthetic and functional characteristics. Such compromise rarely produces optimal or desirable results for the patient.

In addition to traditional non-indexed (customized) way of implant and restoration requiring extensive time, labor and costs, various theoretical and practical implications need to be considered for multiple tooth or full-mouth reconstruction. In multiple implant restorations, "draw," "common path of insertion," "parallel," "passivity" and "stability" are terms that describe the most critical objectives of such a procedure. Draw is perhaps best described as the effects of friction, but not binding.

Multiple implants and their abutments are rarely, if ever, perfectly aligned within the patient's mouth. Traditional methods of multiple tooth restoration require the heads/abutments and prostheses to be modified or made parallel until a common path of insertion is achieved and until the prosthesis is passive with respect to all of the abutments and soft tissue. In other words, it must be possible to place the prosthesis in position by moving the structure onto the abutments in a straight line (i.e., the common path of insertion), with sufficient friction or draw to ensure a firm fit. Once in place, the prosthesis must be passive, which means it must fit the abutments and the soft tissue profile such that there is no undue tension and no motion can take place.

These procedures require a myriad number of instruments and customized parts: typically two surgical procedures, many trips by the patient to the dentist, increased treatment times and prolonged healing periods resulting in an overall reduced quality of life for the patient. Further, an expensive, time consuming and labor intensive "trial and error" system is crucial to such procedures because each prosthesis is custom made to the particular shape, design, location and quantity of abutments for each patient. Therefore, not only are the processes tedious and expensive but each surgical procedure introduces a certain element of risk, pain, and suffering.

In view of the above, there is a need for a dental implant system and associated integrated process of attachment that are simple, predictable and effective. In particular, it is desirable that the dental implant system and attachment process include universal, non-customized and interchangeable components, reduce post-operative infection, improve device/prosthesis strength, prolong its stability, and reduce the overall time for reconstruction procedures. It is also desirable that the dental implant system and associated process enable a practitioner to transfer most of the fabricating, assembling, fitting and adjusting of the final prosthesis from the dental chair side to the bench top in the dental laboratory.

It is an object of this invention to accomplish at least one of the following: It is an object of this invention to provide a process for implanting a prosthesis in a patient's mouth which is substantially less expensive, safer, and less-time consuming than the prior art procedures. It is another object of this invention to invent an indexed universal adaptor abutment to replace multiple components and/or abutments used in the implant and restoration process. It is yet another object of this invention to provide a novel stock or preformed implant denture teeth system that can reversibly attached to the adaptor or its extension. It is yet another object of this invention to provide an adaptor screw with extensions to secure the adaptor to the dental implant. It is another object of this invention to provide a novel universal dental abutment. It is yet another object of this invention to provide a novel carrier for such abutment. It is yet another object of this invention to provide a novel fixed, detachable one piece implant supported bridge. It is yet another object of this invention to provide a process for attaching a prosthesis to a patient which process is substantially more accurate than prior art processes.

BRIEF DESCRIPTION OF THE INVENTION

A dental implant assembly is provided that contains an integrally-formed universal abutment which has a top section, a bottom section integrally joined to the top section, and a passageway extending through these sections. The passageway is formed by different size bores, initially a larger size than decrease in size. The top section of the abutment has a cross-sectional shape substantially like a polygon; the shape is formed by alternating linear and arcuate walls joining to a bottom section having a cross-sectional shape substantially like a polygon.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 4A is an exploded perspective view illustrating abutment screw, abutment and the dental implant ready to retain a stock or pre-formed denture tooth by chemical means;

FIG. 4B is an exploded perspective view illustrating abutment screw, abutment and the dental implant ready to retain a stock or pre-formed denture tooth by mechanical means;

FIG. 5B is a perspective view of two dental implant assemblies of FIG. 3E in the jaw bone with different trajectories, one with abutment screw extension and the other assembly is without the extension;

FIG. 5C is an exploded view of two dental implant assemblies of FIG. 3E in the jawbone with different trajectories with the abutment adaptor and abutment screw removed;

FIG. 6B is a perspective view of a preformed, stock denture tooth with a hex/indexed recess and their corresponding hex insert. One insert has an expandable wire clip to retain the denture tooth;

FIG. 8A is a perspective view of multiple dental implant assemblies of FIG. 3E after implantation;

FIG. 8B is a perspective view of multiple dental implant assemblies of FIG. 3E with the abutment screw extension attached for intraoral imaging acquisition;

FIG. 8C is a perspective view of multiple dental implant assemblies of FIG. 3E with the abutment adaptor and abutment screw removed exposing the internal connection or recess of the implant fixture; an abutment adaptor and abutment screw removed from a dental implant is depicted in the same illustration;

FIG. 8D is a perspective view of an implant/teeth connector where one end is engaging to all implant fixture recesses and the prosthetic end with pre-formed hexed inserts for the insertion of stock denture crowns;

DETAILED DESCRIPTION OF THE INVENTION

Figure 1C:
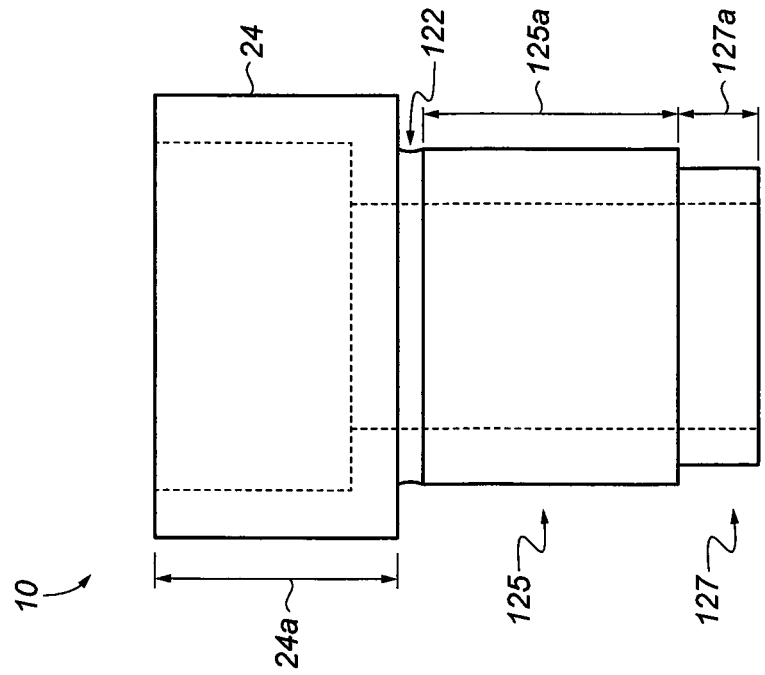
FIG. 1C is a cross section view of one abutment adaptor of the invention.
Figure 1A:
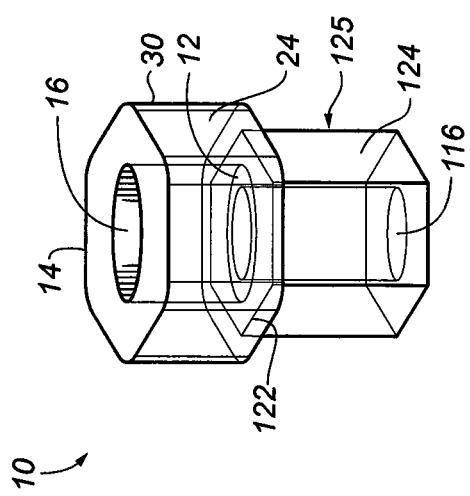
FIG. 1A is a perspective view of one abutment of this invention.

Referring to FIG. 1A, a perspective view of one abutment adaptor 10 is shown. The universal abutment adaptor 10 is a monolithic structure which consists or consists essentially of titanium or titanium alloy. Alternatively, the abutment adaptor 10 may consist of gold, silver, palladium, vanadium, cobalt alloy, stainless steel, ceramic, high performance engineer plastic (PEEK) and the like. Any of the titanium or titanium alloy materials used in implants may be used to make abutment adaptor 10. Thus, by way of illustration and not limitation, one may use one or more of the materials disclosed in U.S. Pat. No. 5,373,621 (a titanium/aluminum/vanadium alloy), U.S. Pat. No. 5,372,660 (a titanium/zirconium alloy), U.S. Pat. Nos. 5,358,529, 5,354,390 (a titanium-base microalloy containing at least 98 weight percent of titanium), U.S. Pat. No. 5,334,264 (a nitrided or colored titanium material), U.S. Pat. No. 5,326,362 (a titanium/aluminum/vanadium alloy), U.S. Pat. No. 5,205,921 (a coated titanium implant), U.S. Pat. No. 5,192,323 (a titanium/aluminum/vanadium alloy), and the like. The disclosure of each of these United States patents is hereby incorporated by reference into this specification.

In one embodiment, the abutment adaptor 10 is machined from pure titanium which is originally in the form of a rod. The titanium meets the standards set forth in A.S.T.M. Standard F 67-88, "Specification for Unalloyed Titanium for Surgical Implant Applications." In general, the material used, regardless of whether it is titanium, titanium alloy, and/or other material, meet the requirements set forth in A.S.T.M. Standard Test F 981-87 "Practice for Assessment of Compatibility of Bio Materials (Non-Porous) for Surgical Implants".

Figure 1B:
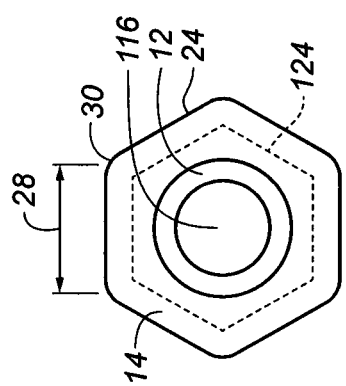
FIG. 1B is a top view of an abutment adaptor with a substantially hexagonal exterior shape.

Referring again to FIG. 1A, it will be seen that abutment adaptor 10 is comprised of a top bore 16 which extends from a top 14 of abutment adaptor 10 to a bottom bore 116. The hollow top bore 16 is indicated in FIG. 1B by a dotted line. Abutment adaptor 10 is comprised of a bottom bore 116 that extends downwardly to form another protrusion 125. The abutment adaptor 10 comprises a hexagonal portion 24 that has a flat surface, the timing of which matches the flat surface 124 of the protrusion 125. The abutment adaptor 10 has a step 12 of the top bore 16, the upper portion of which has a diameter between 1 mm and 10 mm. In one embodiment, the diameter of the top bore 16 is about 3.5 millimeters. In another embodiment, the hollow top bore 16 has a diameter of about 2.0 millimeters. The lower portion of the top bore 16 (i.e. the portion below the step 12) has a diameter that is less than the diameter of the upper portion. For example, the lower portion may have a diameter that is between 60% and 99% of the diameter of the upper portion. In one embodiment, the lower portion is between 70 and 90%, or about 80% of the diameter from the upper portion. The distance between the top 14 of abutment adaptor 10 and the step 12 is 2.0 millimeters. In another embodiment, the distance between the top 14 and the step 12 is 3 mm. The distance between top 14 and junction 122 is 3.0 millimeters. In the embodiment depicted in FIG. 1A, the distance between opposite linear surfaces on the exterior of the hexagonal sleeve is about 3.9 millimeters and the distance between opposite curved surfaces 30 on the exterior of the hexagonal sleeve is about 4.1 millimeters.

FIG. 1A illustrates one structure near junction 122. In one embodiment, the junction 122 is an annular groove. It will be seen that, in the embodiment illustrated, junction 122 is disposed beneath substantially hexagonal portion 24 of abutment adaptor 10. The junction 122 has a depth (e.g. the depth of an annular groove) which, in one embodiment, is from about 0.0 millimeter to about 5.0 millimeters. In another embodiment, the depth of the junction 122 is between 0.1 mm and 5 mm. In one embodiment, the depth is from about 0.1 to about 1.0 millimeters. In the embodiment illustrated in FIG. 1A, junction 122 is 0.0 millimeter. In one embodiment the junction 122 has a substantially circular shape to form an annular groove. In another embodiment, the junction 122 has a radius of curvature of from about 0.0 to about 0.2 millimeters. In one embodiment, the radius of curvature of the junction 112 is about 0.10 millimeters. Without wishing to be bound to any particular theory, applicant believes that this structure provides a more secure attachment to devices attachable to abutment adaptor 10. In the embodiment of FIG. 1A, the substantially hexagonal portion 24 has rounded corners provided by curved surface 30. This is also illustrated in FIG. 1B, which is a top view of the structure of FIG. 1A.

Referring to FIG. 1B, it will be seen that hexagonal portion 24 is comprised of exterior surface which contains alternating linear portions 28 and curved portions 30. Without wishing to be bound to any particular theory, it is believed that the rounded corners (curved portions 30) in this structure are substantially compatible with the patient's mouth. Thus, e.g., these rounded corners do not irritate the patient's tongue during eating as much as the sharp corners present on conventional hexagonal structures. In one embodiment, the length of each linear portion 28 may be substantially equal to the length of each of the other linear portions 28. In one embodiment, the substantially hexagonal shape depicted in FIG. 1A is substantially symmetrical. In one embodiment, the length of each linear portion 28 is at least about 1.2 times as long as the length of each curved portion 30. In one embodiment, the length of each linear portion 28 is at least about three times as great as the length of each curved portion 30.

FIG. 1C depicts another embodiment of the abutment adaptor 10. The embodiment in FIG. 1C comprises the hexagonal portion 24, joined by the protrusion 125 by junction 122. In the embodiment of FIG. 1C the junction 122 is an annular groove. The protrusion 125 is a hexagonal protrusion as shown in FIG. 1B. The embodiment of FIG. 1C further comprises a rounded extension 127 in the form of a collar or cone. The rounded extension 127 serves to extend the depth of the abutment adaptor 10 to provide increased stability during use. The indexed protrusion 125 translates the indexing of the implant fixture (see implant fixture 340 of FIG. 3A) to the abutment adaptor 10. The lengths 125*a*, 127*a* and 24*a* of the protrusion 125, the rounded extension 127, and the hexagonal portion 24 are set such that the length 24*a* is about three times the length of length 127*a*. The length 125*a* is about twice the length of the length 127*a*.

Figure 1E:
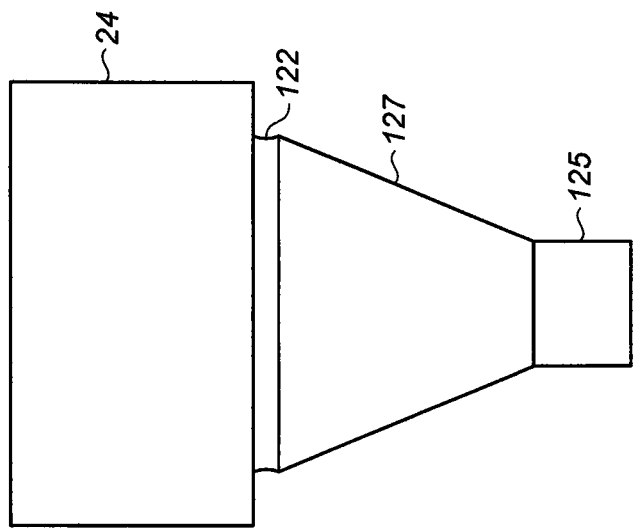
FIG. 1E is a cross section view of one abutment adaptor of the invention.
Figure 1D:
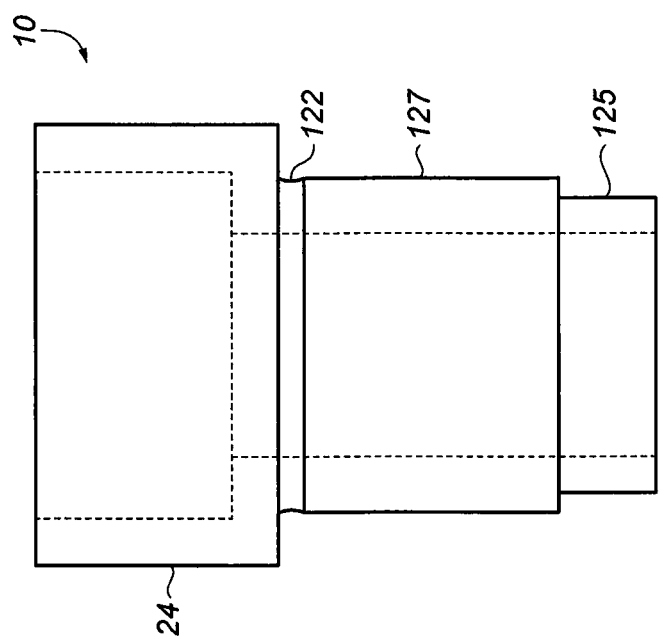
FIG. 1D is a cross section view of one abutment adaptor of the invention.
Figure 1G:
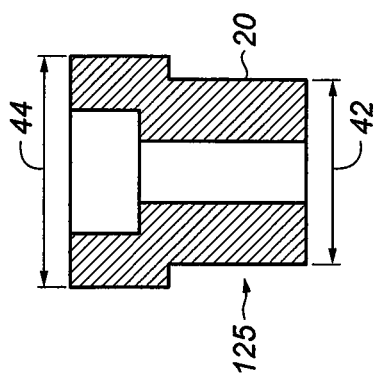
FIG. 1G is a perspective view of the abutment adaptor with the top section as a substantial hexagonal shape and the bottom is a substantial hexagonal shape

As shown in FIG. 1D, the hexagonal protrusion 125 and the rounded extension 127 are reversed such that the rounded extension 127 is contiguous with the hexagonal portion 24 by way of the junction 122. The embodiment of FIG. 1E is substantially similar to the embodiment of FIG. 1D except in that rounded extension 127 is cone shaped such that the cone extends downward and inward.

As will be apparent to those skilled in the art, the hexagonal portion 24 of abutment adaptor 10 may have an exterior shape which need not be substantially hexagonal but may assume the shape of other polygons provided it is indexed to the timing of the protrusion 125 (see FIG. 1A). FIG. 1F depicts examples of various shapes of the hexagonal portion 24. The top of the abutment may have various shapes such as a shape with linear walls (triangular, square, pentagonal, polygonal cross-sectional shapes), curved shapes (reverse curves), splines or cams with lobes capable of engaging two or more surfaces for the purposes of indexing and location of the dental implants.

Figure 1H:
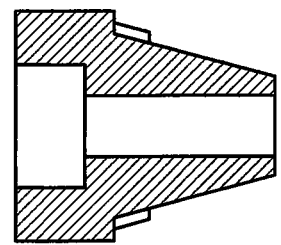
FIG. 1H is a cross-sectional view of the abutment adaptor of FIG. 1G.
Figure 1I:
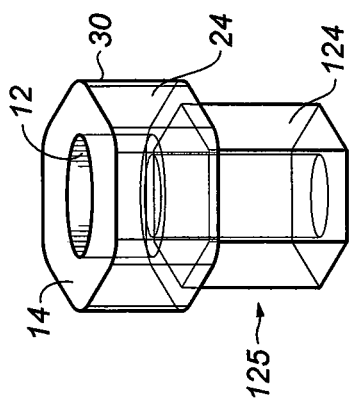
FIG. 1I is a perspective view of the abutment adaptor with the top section as a substantial hexagonal shape and the bottom is a substantially conical shape.
Figure 1J:
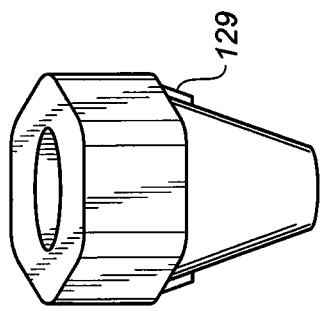
FIG. 1J is a cross-sectional view of the abutment adaptor of FIG. 1I
Figure 1F:
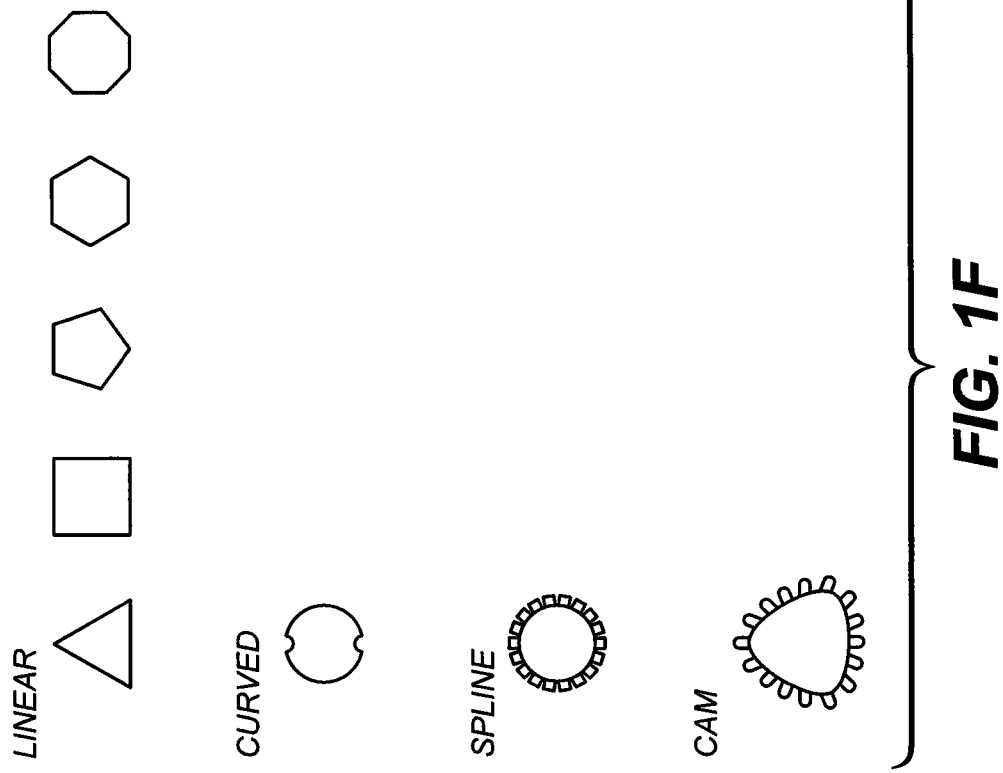
FIG. 1F is top view of sections of other embodiments with various shapes such as triangular, square, pentagonal, polygonal cross-sectional shapes.
Figure 3A:
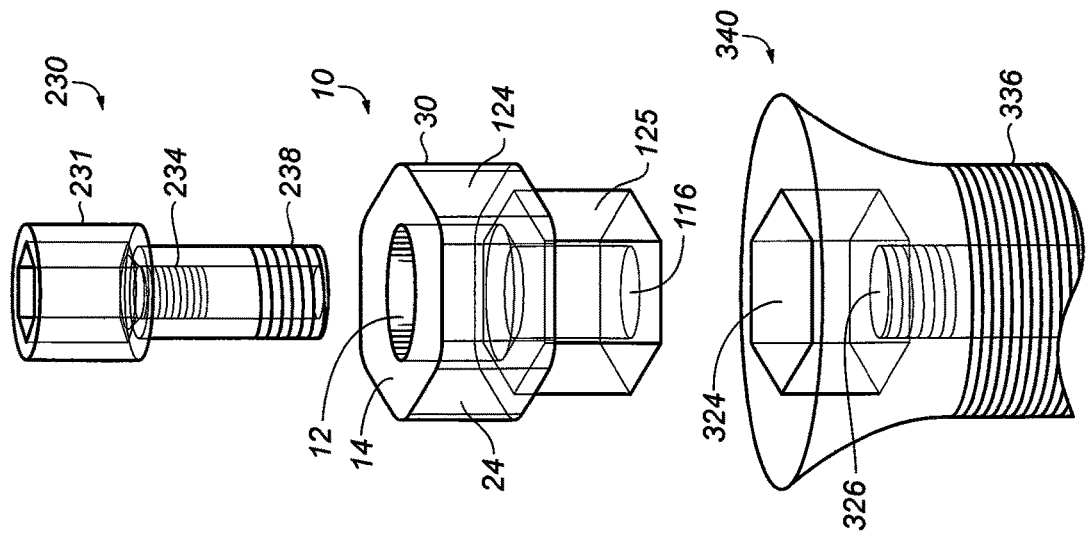
FIG. 3A is an exploded perspective view illustrating how the abutment retaining screw of FIG. 2A may be attached to an abutment adaptor and an implant fixture.

Referring to FIGS. 1G to 1J, and in the embodiments depicted therein, it will be seen that protrusion 125 of abutment adaptor 10 has a substantially hexagonal cross-sectional which is adapted to mate with the internal connections or recess with a hexagonal shape of the upper portion of an implant fixture 340 (see FIG. 3A). FIG. 1H is a sectional view of the abutment adaptor 10 of FIG. 1A. Referring to FIG. 1H, it will be seen that the base 20 of abutment adaptor 10 has a width 42 at its bottom which is substantially less than its width 44 at its top. In general, width 44 is at least about 1.1 times as great as width 42. In one embodiment, width 44 is 4.7 millimeters, and width 42 is 4.0 millimeters. In the embodiment shown, the distance between opposing linear walls of the hexagonal shape is 2.4 millimeters. FIG. 1I and FIG. 1J depict a conical protrusion. In the embodiment of FIG. 1I and FIG. 1J, the conical protrusion comprises an indexing feature 129 that engages and is indexed to the implant fixture 340 (see FIG. 3A). Examples of suitable indexing features include cams, splines, lobes, gears, and the like.

Figure 2B:
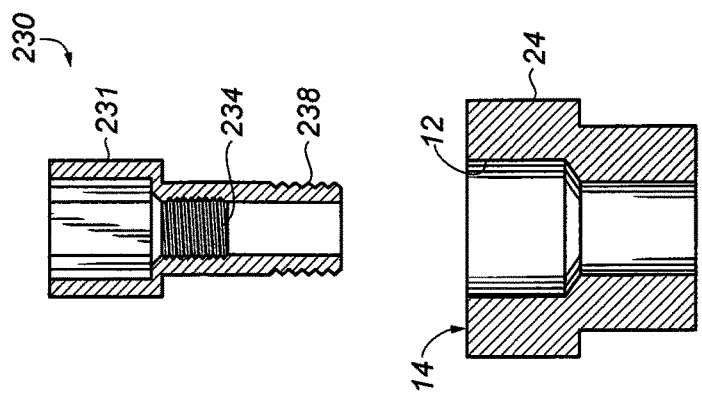
FIG. 2B is a perspective and sectional view of the abutment adaptor.
Figure 2A:
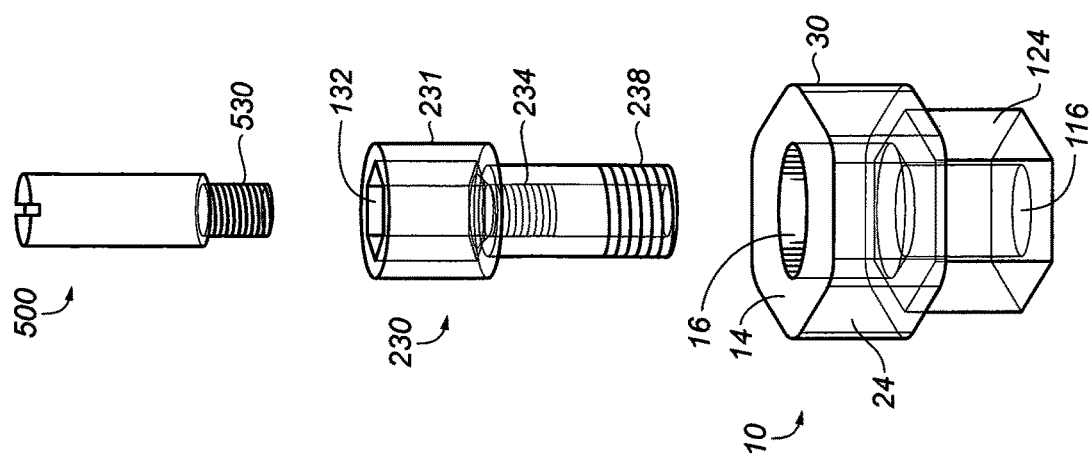
FIG. 2A is a perspective and sectional views of the abutment adaptor screw with the top section larger than a proximal end, where the top section has a hexagonal recess and a threaded bore located immediate below the hexagonal recess.

In FIG. 2A the upper portion of the bore above step 12 has a diameter of about 3.0 mm that is sufficient for an abutment screw 230 to pass through it. In another embodiment stepped step 12 has a diameter 2.0 millimeters. The abutment screw 230 is comprised of an internal bore 132 with internal threads 234 adapted to receive and engage with external threads 530 of an extension 500 and/or a multiplicity of dental prostheses (not shown). The abutment screw 230 is comprised of top section 231 which is adapted to fit within the hollow top bore 16 (see FIG. 2A) and mesh with the flat or chamfer section between the step bores therein. The abutment screw 230 is also comprised of external thread 238 which, after passing through abutment adaptor 10, may be secured to threaded orifice 326 (see FIG. 3A) of the implant fixture 340. A vertical extension 500 of the abutment screw 230 is also disclosed. The extension 500 has a length such that it fully extends through the hollow top bore 16 to expose the external treads 238 such that they can engage the threaded orifice 326 of the implant fixture 340. In one embodiment the extension 500 is at least 10% to 50% longer than the abutment adaptor 10 such that 1 mm to 10 mm of the external treads 238 is exposed.

Referring to FIG. 2B, substantially hexagonal portion 24 extends from the top 14 of abutment adaptor 10 to junction 122. In one embodiment the distance between top 14 and junction 122 of abutment adaptor 10 extends at least about 55 percent of the entire height of abutment adaptor 10. In one embodiment, the distance between top 14 and junction 122 is about 3.0 millimeters. The step 12 of the top bore 16 is disposed between the hollow top bore 16 and bottom bore 116 and has a diameter which continually decreases from the hollow top bore 16 to the bottom bore 116, thereby forming a chamfered or flat surface. In one embodiment the chamfered surface forms an obtuse angle (as measured with respect to the interior wall of the stepped bore 12 of hollow top bore 16) of from about 120 to about 150 degrees.

In another embodiment (not shown) an implant carrier is provided which is adapted to be removably connected to the abutment adaptor 10 and to manually deliver it into the jaw of a patient. In one embodiment, the carrier is an integral assembly which consists essentially of non-toxic plastic material that is medical grade. One may use any of the medical grade material known to those skilled in the art such as, e.g., the plastics described in U.S. Pat. No. 5,356,709 (polypropylene, PEEK, copolymer; styrene/ethylene/butylene/styrene copolymer), U.S. Pat. No. 5,312,251 (medical grade ceramic material), U.S. Pat. No. 5,326,364 (medical grade ceramic) and the like. The disclosure of each of these United States patents is hereby incorporated by reference into this specification. In one embodiment, the carrier consists essentially of high density and performance engineering plastic such as PEEK, polypropylene which is extruded into the desired shape. In one embodiment, removable cover and carrier is color coded to indicate which part it is to be used in connection with.

FIG. 3A is an exploded view of the abutment adaptor 10, the implant fixture 340 and the abutment screw 230. External threads 238 engage threaded orifice 326. The protrusion 125 is indexed with respect to the timing of the internal hex wall 324 of the implant fixture 340. This permits the mechanical engagement of the system to maintain the orientation of the device throughout its installation and function. In conventional systems that install multiple implants non-indexed engagements are traditionally used because practitioners believe the non-indexing approaching is required to overcome different trajectories of multiple implants. In contrast, the disclosed indexed approach provides multiple benefits while allowing multiple implants to be installed simultaneously. These benefits include increase in stability of the system, reduction in complications and a decrease in time and expense.

Figure 3C:
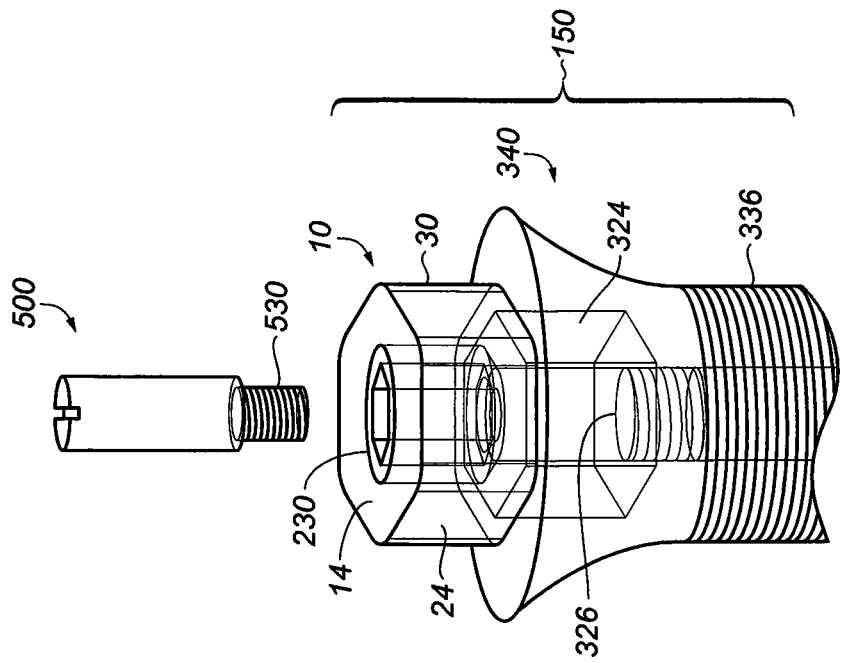
FIG. 3C is an exploded perspective view illustrating how the abutment screw extension can be attached to abutment retaining screw of FIG. 2A with the whole implant assembly.
Figure 3B:
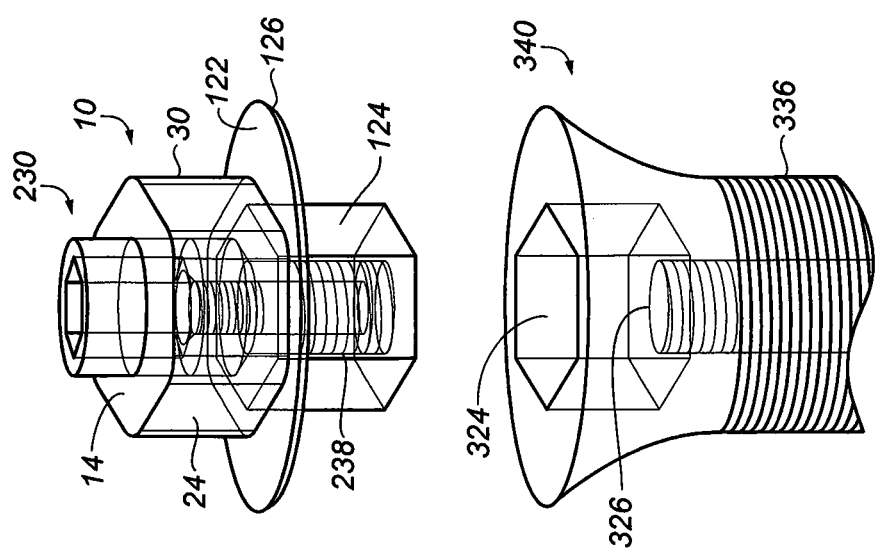
FIG. 3B is an exploded perspective view illustrating how the abutment retaining screw of FIG. 2A may be attached to an abutment adaptor with a horizontal shoulder.

FIG. 3B is an exploded perspective view illustrating that, after retaining abutment screw 230 is passed through abutment adaptor 10, it may be screwed into threaded orifice 326 of implant fixture 340 and become removably engaged with the internal hex walls 324 of the recess in implant fixture 340 and with the internal threads located within threaded orifice 326.

In the embodiment of FIG. 3B the junction 122 is dispose between the top part and the bottom part of the hexagonal abutment adaptor. The junction 122 is a ledge that has a thickness and extends vertically downward and inward toward the bottom bore 116 to form a ledge 126 (sometimes referred to as a shouldered collar) with a thickness between 0 mm and 2 mm. FIG. 3B illustrates the structure near ledge 126. In the embodiment illustrated ledge 126 is disposed beneath substantially hexagonal portion 24 of abutment adaptor 10. Disposed between substantially hexagonal portion 24 and ledge 126 is an annular groove (not shown). Without wishing to be bound to any particular theory, applicant believes that this structure provides a more secure attachment to devices attachable to abutment adaptor 10. In the embodiment illustrated in FIG. 3B, implant fixture 340 is comprised of external threads 336 which can be used to secure implant assembly within the jawbone of a patient.

FIG. 3C is a perspective view of an assembly 150 comprising the abutment screw 230, the hexagonal abutment adaptor 10 and the implant fixture 340. In addition, a removable extension 500 can reversibly attached to the assembly 150 for the prosthetic part of the restorative process (either digitally or manually) without changing any components. The abutment adaptor 10 and abutment screw 230 may be used in conjunction with an implant fixture 340. This assembly is quite adaptable and may be used with substantially any of the implant fixtures with internal connection known to those skilled in the art. Thus, by way of illustration and not limitation, one may use one or more of the implant fixtures disclosed in U.S. Pat. Nos. 5,338,197; 5,061,181; 5,030,095; 4,960,381; 4,932,868; 4,871,313; 4,854,873; 4,854,872; 4,713,004; 4,468,200; 4,330,891; 4,016,651; 3,672,058; 3,579,831; 2,609,604; 5,376,004; 5,364,268; 5,362,235; 5,302,125 and the like. The disclosure of each of these United States patents is hereby incorporated by reference into this specification. The implant fixture 340 is connected to abutment adaptor 10 by means of the abutment screw 230. The abutment screw 230 is shown in more detail in FIG. 2A.

Figure 3D:
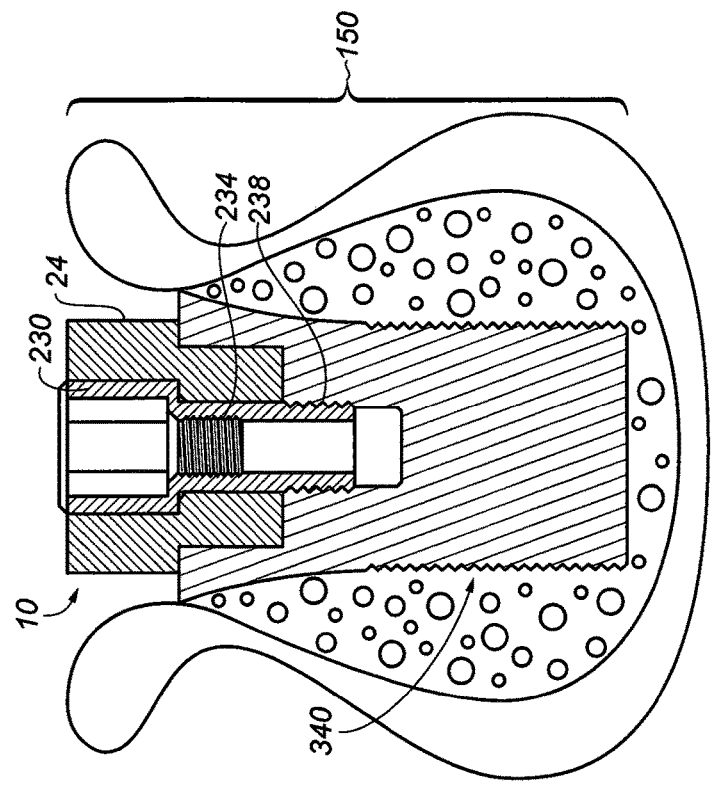
FIG. 3D is an exploded perspective view illustrating how a mechanical hex socket/driver can engage the abutment adaptor of the implant assembly to deliver the implant assembly into jaw bone after soft tissue is reflected.

FIG. 3D is an exploded cross sectional view of the assembly 150 showing the abutment adaptor 10, the abutment screw 230 and the implant fixture 340 disposed beneath a socket wrench 152 with a hexagonal bore 154. As will be apparent to those skilled in the art, socket wrench 152 may be removably attached to the substantially hexagonal portion 24 of the abutment adaptor 10 and used to insert assembly 150 into a hole in the patient's jaw. Alternatively, or additionally, depending upon the amount of force needed, a carrier may be used for this purpose or, alternatively, to start the insertion of the assembly 150 in the hole. The abutment adaptor has an exterior hexagonal shape; and thus it is adapted to be screwed into the hole in the patient's jaw by a socket wrench 152 with the matching hexagonal bore 154. It will be apparent, however, that the means of inserting the assembly 150 into the hole in the patient's jaw will vary with the type of implant fixture 340 used. Thus, for example, when the exterior shape of implant fixture 340 is substantially cylindrical, a seating tool (such as a mallet) may be used. These procedures are well known to those skilled in the art.

Figure 3E:
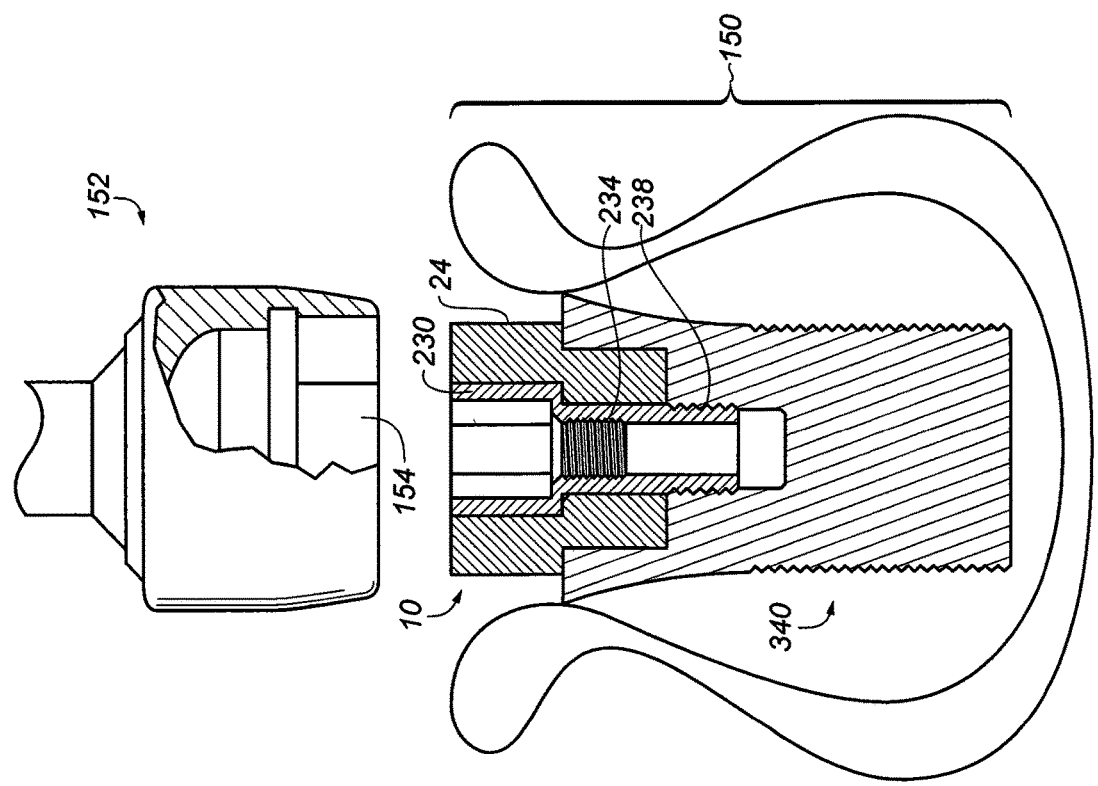
FIG. 3E is an exploded perspective view illustrating abutment adaptor of the implant assembly in situ acting as healing abutment to prevent collapse and closure of the soft tissue over the implant assembly.

FIG. 3E is a cross sectional perspective view of the assembly 150 in the jaw bone under healing condition for a period of time for the bone to fuse with the titanium implant assembly. The hexagonal abutment adaptor 10 acts as a healing abutment keeping the soft tissue apart exposing the top section of the abutment adaptor 10 thus avoiding the second stage exposure surgery. Alternative, a healing ball may be used (see U.S. Pat. Nos. 5,564,924; 6,068,479; 7,207,800; 8,500,449 and 5,733,124). The disclosure of each of these United States patents is hereby incorporated by reference into this specification. In one embodiment, the healing ball consists essentially of medical grade material such as, e.g., medical grade polyethylene, high performance plastic (PEEK). In one embodiment, healing ball consists essentially of high-density polyethylene or titanium.

Figure 3G:
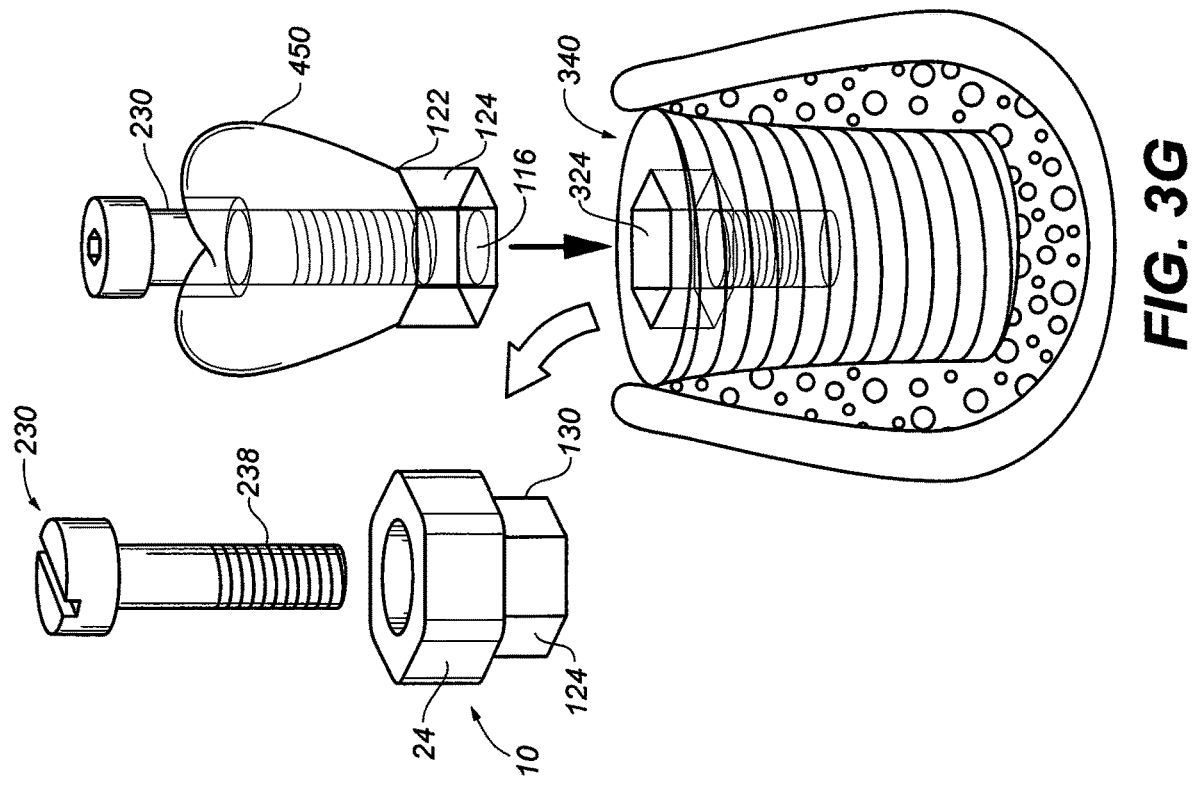
FIG. 3G is an exploded perspective view illustrating the removal of the abutment adaptor and abutment screw to be replaced by the final crown/adaptor ready to removably attached to the dental implant with the abutment screw.
Figure 3F:
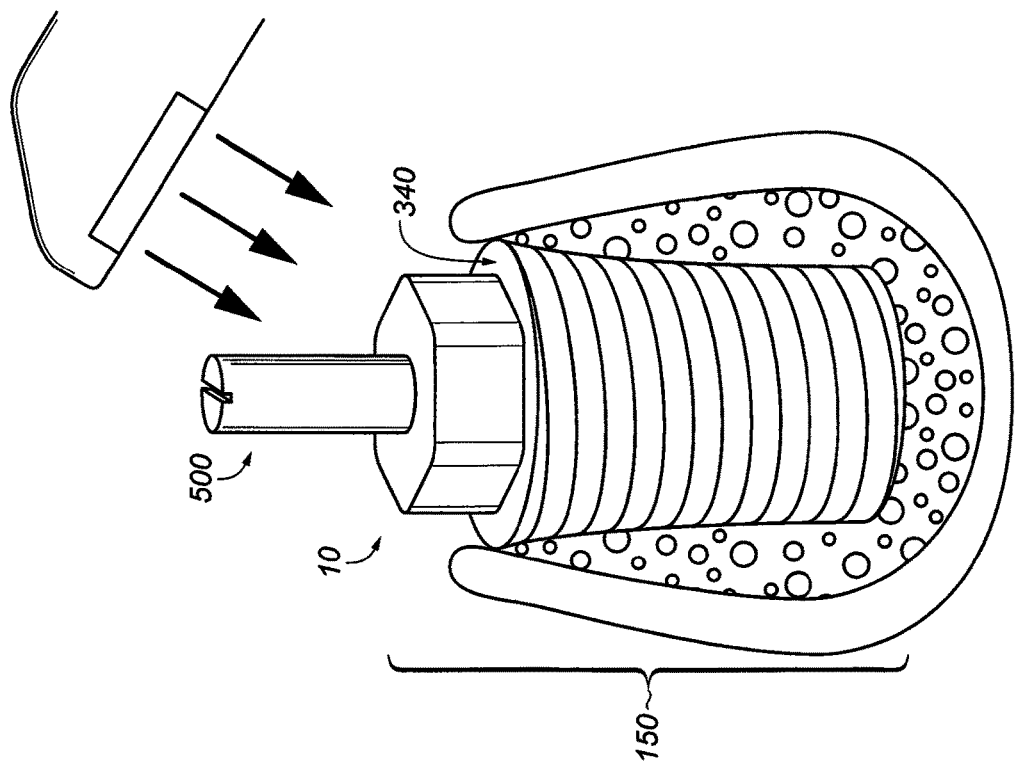
FIG. 3F is an exploded perspective view illustrating the abutment screw extension attached to the abutment adaptor of the implant assembly in situ acting as a scan abutment to allow accurate capture the trajectory and horizontal timing of the hexagonal dental implant assembly in the jaw bone.

FIG. 3F is a partial perspective view of the implant fixture 340, when implant 340 is "osseintegrated" to the bone without mobility or pain. The three dimensional position of the hexagonal abutment adaptor 10 and implant fixture 340 can be scan intra-orally and determined with the extension 500 removably attached to the internal threads 234 of the abutment screw 230 (both not shown) acting as a scan body. The extension 500, together with healing ball, described elsewhere is used to perform the manual transfer of the assembly 150 into working stone model. Thus, as will be apparent to those skilled in the art, the hexagonal abutment adaptor 10 is universal and may be used in conjunction with many different types of prosthetic applications. It thus affords the dental practitioner substantially more flexibility than does the prior art systems, which utilize a substantial number of parts which are adapted for specific applications.

Thus, by way of further illustration, and referring to FIG. 3F, the impression process may be incorporated into a fixed detachable implant supported bridge. See, e.g., U.S. Pat. No. 5,174,954, the entire disclosure of which is hereby incorporated by reference into this specification.

FIG. 3G is an exploded perspective view of a dental crown 450 which incorporated the top section of the hexagonal abutment adaptor 10 into the crown 450 proper while exposing only the protrusion 125 and top bore 16. After removal of the universal hex abutment adaptor 10, the abutment screw 230 can be used to attach the crown 450 to the internal hex walls 324 matching the "timing" of both hexes replacing universal hex abutment adaptor 10. Because the timing of the indexed dental crown 450, and the timing of the implant fixture 340 matches the timing of the indexed abutment adaptor 10 (now removed) dental crown 450 can be properly attached.

FIG. 4A is an exploded view of the implant assembly 150 with a pre-formed, stock denture crown with indexing recess 424 and gingival seat 414. FIG. 4B is another exploded view of implant assembly 150 with a custom made crown 410 with an indexed insert 420, indexing recess 424 and gingival seat 414. A retaining screw 411 is also included.

Figure 4C:
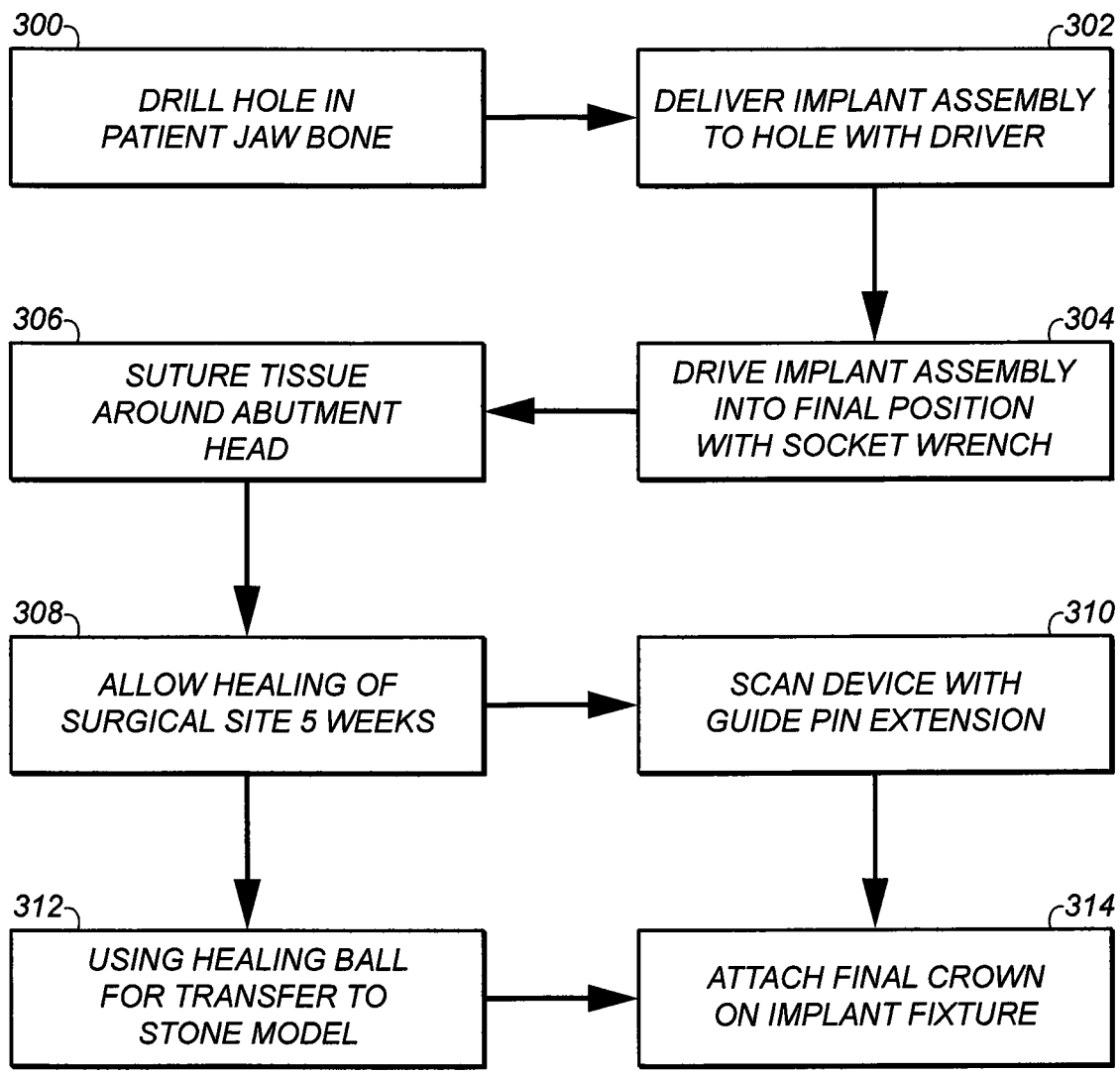
FIG. 4C a flow diagram depicting an exemplary method of attaching a single dental crown.

FIG. 4C is a flow diagram of one process of the invention for a single crown. In the first step of this process, step 300, a hole is drilled in the jawbone of the patient sufficiently deep to receive only the length of the implant fixture 340. In general, this hole is usually from about 8 to about 18 millimeters. Thereafter, in step 302 of the process, implant assembly 150 is delivered to the hole. Placement into the prepared hole is started via a hand carrier or via an engine driven socket wrench. Thereafter, in step 304 of the process, the abutment/implant fixture is driven to a pre-determined position usually with the ledge of the abutment adaptor 10 level with the bone using the engine driven socket wrench at slow speeds (e.g. 30-40 RPM). Thereafter, in step 306 of the process, a suture is applied to the flap around the abutment adaptor 10. Thereafter, in step 308, the surgical site is allowed to heal. In general, a healing period of from about 4-5 weeks is desirable. After the desired time of healing, no additional surgical procedure is required, unlike the prior art process (which necessitated second stage surgery to remove the cover screw used in the process and to attach the prosthetic abutment). By comparison with prior art processes, applicant's prosthetic abutment is already attached.

At this stage of the process, two options are available. In one embodiment, illustrated in step 310 (also see FIG. 3F), the abutment extension guide pin is attached to the abutment screw for intra-oral scanning of the device. The resulting image is imported into a CAD software output to CAM for the digital manufacturing of the dental prosthesis. In another embodiment, illustrated in step 312, a healing ball is used to transfer the abutment head/device position manually to a stone working model. Traditional lost wax technique can be sued to fabricate the implant supported crown. Thereafter, in step 314, the final crown 450 can be used to replace the hex abutment adaptor 10.

Figure 5A:
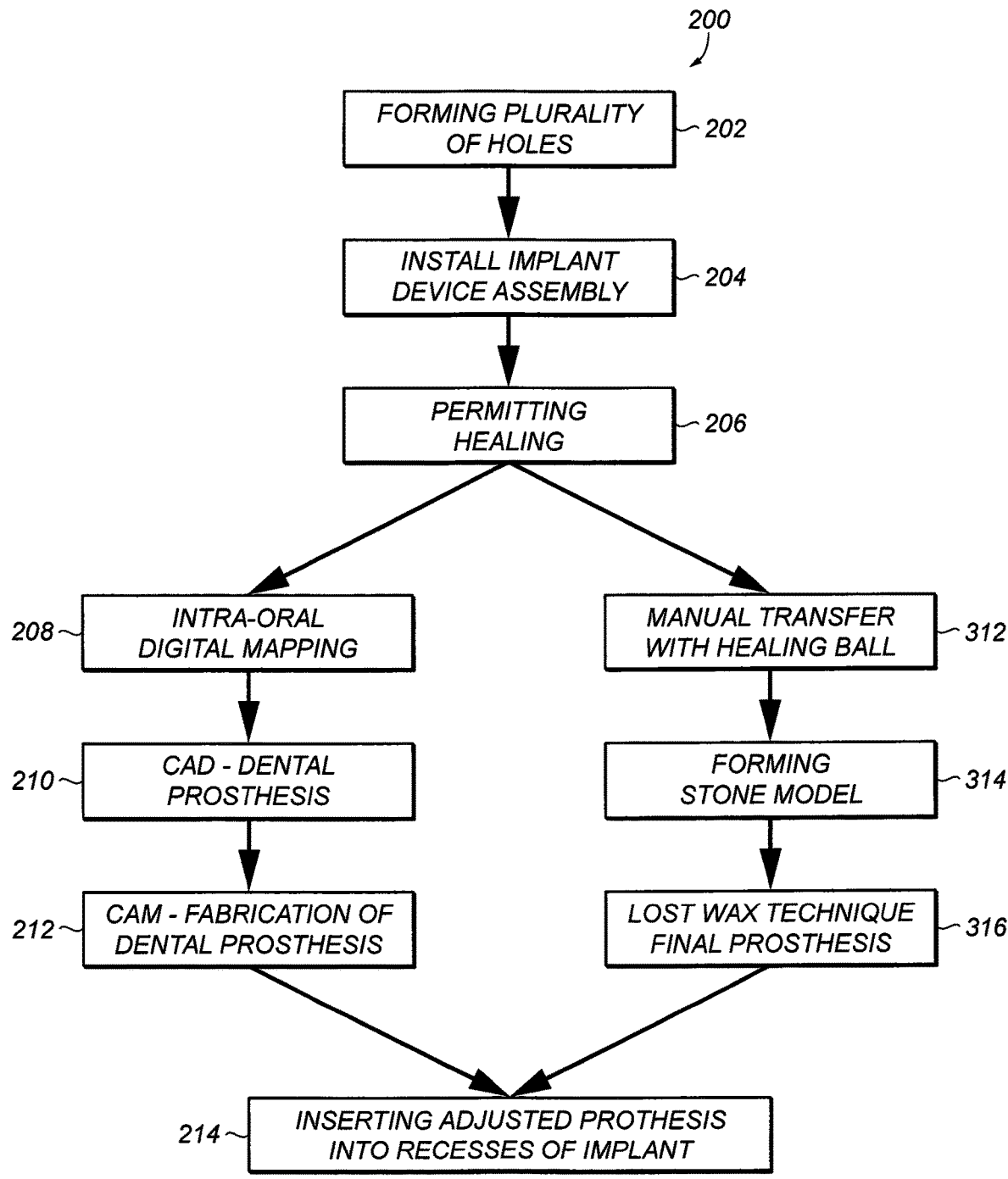
FIG. 5A is a flow diagram depicting an exemplary method of attaching a one piece dental prosthesis to multiple implants.

As shown in FIG. 5A, one embodiment of the present invention contemplates a method 200 of dental reconstruction. The method 200 comprises a step 202 of forming a plurality of holes 301 (see FIG. 5B) in a patient's jawbone 302 during a single surgery. See FIG. 5B. The holes 301 may be drilled to be sufficiently deep to receive only a length of an implant (see implant assembly 150). In general, the holes 301 are about eight to about twenty millimeters deep. The holes 301 are positioned in an edentulous space in the patient's mouth. In step 204, an implant device assembly 150 is installed into each of the holes. One exemplary implant 150 is shown in FIG. 3E. An implant is the portion of a dental prosthesis that is disposed within the jawbone of a patient. The implant assembly 150 is comprises of the hexagonal abutment adaptor 10 and the abutment screw 230 that is secure to the threaded orifice 326 of implant fixture 340.

In the embodiment of FIG. 5B two device assemblies 150 were disposed in different trajectories and allowed to heal. When the devices are healed (step 206) sufficiently, tissue covering the device will shrink exposing partially the hexagonal abutment adaptor 10 and the extension of the abutment screw with extension 500. The position of each device in relationship to each other and with other remaining oral structures including soft tissue, teeth etc. are scanned to digitally form an accurate image of the implants. The pre-assembled hexagonal abutment serves to obstruct tissue re-growth during healing to avoid a second surgery. After the desired time of healing, no additional surgical procedure is required, unlike the prior art process (which necessitated second stage surgery to remove the cover screw used in the process and to attach the prosthetic abutment). By comparison with prior art processes, applicant's abutment is already attached or pre-assembled. Healing aids may be used to promote healing. For example, the implant fixture 340 may include coated surfaces. See U.S. Pat. No. 7,207,800, the content of which is hereby incorporated by reference. The indexing of the flat-edged protrusion of the hexagonal abutment allows the protrusion to relate to the three dimensional location of the device therefore the precise three dimensional location of the internal hex walls 324 of the implant fixture 340. See FIG. 3B.

The exemplary internal hex wall 324 of FIG. 3B has at least two adjacent walls that form an angle relative to one another such that the recess is not merely circular. In the exemplary embodiment depicted there are six flat-edged walls that form the internal hex wall 324 to provide a hexagonal recess. In other embodiments, more or fewer flat-edged walls are provided. Such walls allow for the engagement of an abutment engaging the implant fixture for anti-rotational and other indexing means. In other embodiments (e.g. FIG. 3C) the recess or internal cavity or shaft consists of a threaded portion, and a two part interlock chamber contiguous to the said threaded portion including multi-lobed surfaces in a first part, and a plurality of lobes, slots or grooves in a second part. The anti-rotational part completes a series of functions. First, its main function is to prevent the piece from rotating in relation to the dental implant. Furthermore, in the event that the piece is a prosthetic element, the anti-rotational part guarantees the resistance of the implant during the insertion phase of the prosthetic element and facilitate the positioning and insertion of the prosthetic element, creating a guide to facilitate the assembly of the prosthetic element on the dental implant. Any protrusions may be connected to a dental implant, such that the implant and the protrusions are capable of being connected to each other by an internal connection. The protrusion behaves as a male element and the dental implant recess behaves as a female element. The inventive internal connection guarantees great strength and resists biting forces over the long term. In the exemplary embodiment there are six splines and the male protrusions have equal number of splines in order to mate into a stable interconnections. Yet in another embodiment, the recess consist of a threaded portion disposed beneath two adjacent flat-edged walls portion and further dispose beneath a tapered portion whereby the top tapered portion terminate to the neck and surface of implant. The one or more illustrative embodiments are intended only to provide a brief overview of subject matter disclosed herein. The combination of different engaging geometric configurations such as lobes, flat edged walls, cylinders, taper, conical, triangular, square, octagonal, polygonal, threads, splines, gears and the different vertical disposition of each or in combination thereof can be made to match the recess and protrusions to form a stable connection or mate between the implants and the abutment/prosthesis. See also U.S. Pat. Nos. 4,960,381; 6,733,291; 7,108,510; 8,123,524; 5,897,319; 7,108,510; 6,537,070; 7,396,231; 5,195,892; and patent publications 2012/0310286; 2012/0021381; 2013/

0183637; 2008/0261176; the entire content of which is hereby incorporated by reference into this specification.

Referring again to FIG. 5A, in step 208 of method 200, the patient's mouth is digitally mapped with a computer to produce a three dimensional map including a map of the location of the implants of each hole. In this fashion, the relative position of each of the implants is determined. Alternatively, in step 312 of method 200, with extension 500, a healing ball is attached to each hex abutment adaptor 10 for each assembly 150. The entire healing ball is splinted together using a chemical auto-polymerized resin luted together as one unit. After unscrewing all the extensions, the splinted healing ball framework can be pick up or incorporated in a wash putty final impression. A hexagonal abutment adaptor analog can be used to replicate the device positions in the mouth on a stone model (step 314). Traditional lost wax technique can be sued to fabricate the implant supported crown (step 316) from the stone model.

Step 208 will now be described in further detail with reference to the example depicted in FIG. 5B. During step 208, the longitudinal axis of each implant can be determined by extension of the abutment screw with the extension 500 to exaggerate the orientation of the implant assembly 150. For example, and with reference to FIG. 5B, a longitudinal axis 500a is determined for an implant 150a whereas a different longitudinal axis 500b is determined for an implant 150b. To facilitate such a determination, the extension 500 may include optical or radiographic markers that permit a computer or receiver to identify the longitudinal axis of the protrusion 125. Other suitable optical markers may also be used, including colored surfaces with various patterns. The extension 500 extends the height of the implant assembly 150 to facilitate the accurate optical registration of the implants image in the jawbone in relationship to oral structures, such as existing dentition, oral tissues anatomical landmarks. The length of the extension must be sufficiently long to accurately capture the internal trajectory of each implant fixture. A length from about 2 mm to 20 mm may be used. In one embodiment, the length is from about 5 mm to about 12 mm. In another embodiment the length is from about 8 mm to about 12 mm. In yet another embodiment, the length is 10 mm.

A digital dental map is produced with laser, optical, coherence tomography, wherein the abutment screw extension 500 facilitates integrated acquisition of the implant fixture 340 accurately. The extension 500 permits accurate determination one axis of orientation (e.g. Y-axis). The hexagonal portion 24 (see FIG. 1A) provides multiple flat walls to accurately determine the other axes of orientation (e.g. X-axis and Z-axis). Other imaging devices and methods that allow the non-contact, non-invasive capture or re-constitution of the relative orientation of the multiple implants in the jawbone are also contemplated for use with the present method. A digital map is formed from dental software acquired by the scanned image. In step 210, typical workflow from laser, optical intra-oral scanned images produce highly accurate computer-aided drawings (CAD) files, build and edit virtual model for use in computer-aided manufacturing (CAM) (step 212). With available open source CAD/CAM software, a final prosthesis can be produces substractively or additively from various suitable, biocompatible dental materials such as but not limited to fabricate a multitude of restorations including inlays, onlays, veneers, full crowns and bridges. The restorations are fabricated from a number of materials including resin, porcelain and acrylic using prefabricated milling blocks of the chosen material (e.g. zirconia and titanium). Other suitable materials include lithium disilicate glass ceramic, hybrid cerics, leucite-reinforced glass ceramics, nickel-free cobalt chrome alloys, high performance engineering plastic (PEEK) and the like. The dental implant system and associated process enable a practitioner to form a final prosthesis, including an infinite number of facsimiles of the final prosthesis, based on a laser, 3D optical intraoral or table top scan impression that is designed and manufactured from CAD CAM processes to produce and insert the final prosthesis. In the example depicted in FIG. 5C an exploded perspective view of assembly 150 showing that the internal hex walls 324 of the implant fixture 340 is a hexagonal recess and the protrusion 125 is a hexagonal protrusion.

Figure 5D:
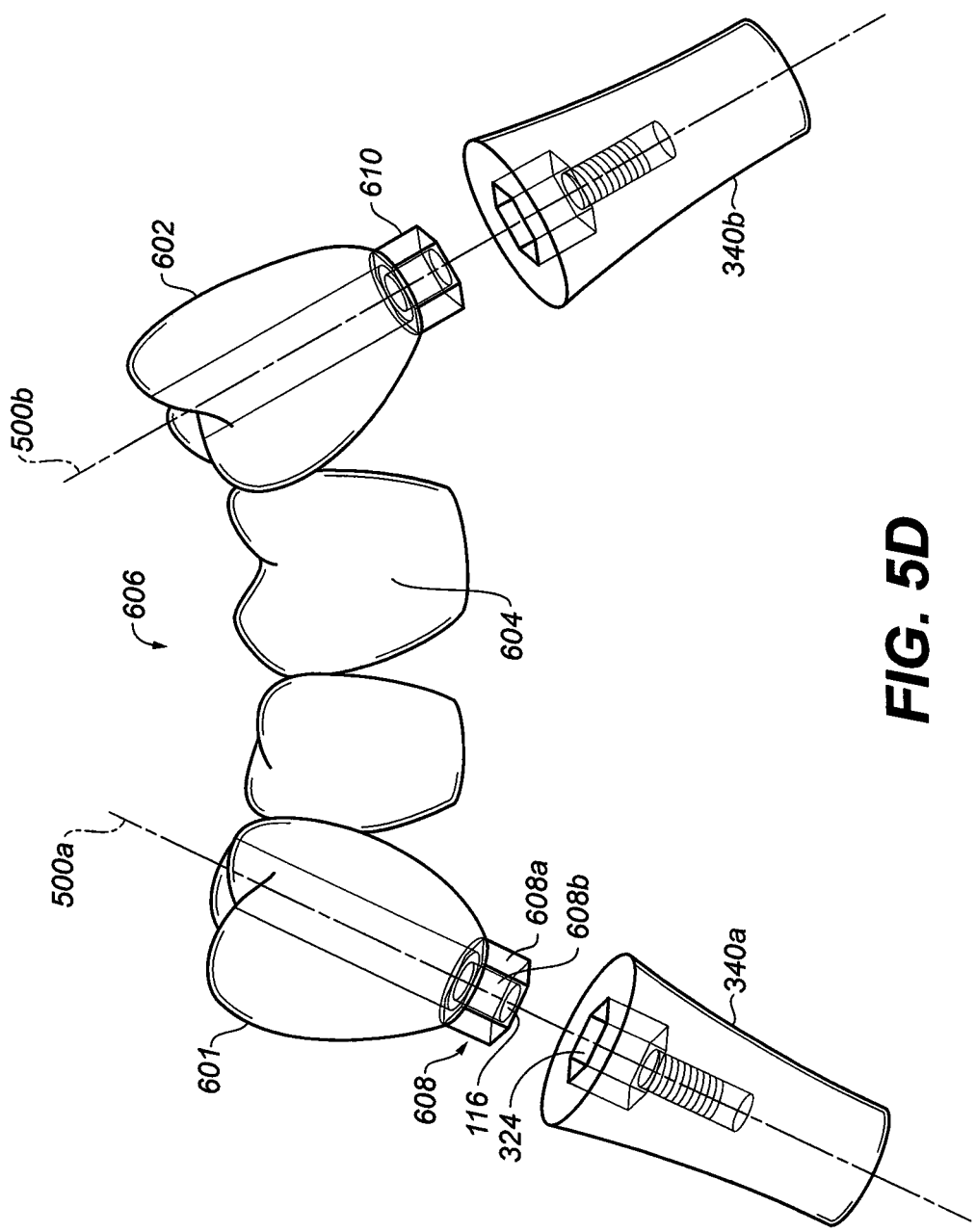
FIG. 5D is a perspective view of two dental implants of FIG. 3E with the abutment adaptor and abutment screw removed; and the one-piece dental bridge with two symmetrical protrusions.
Figure 5E:
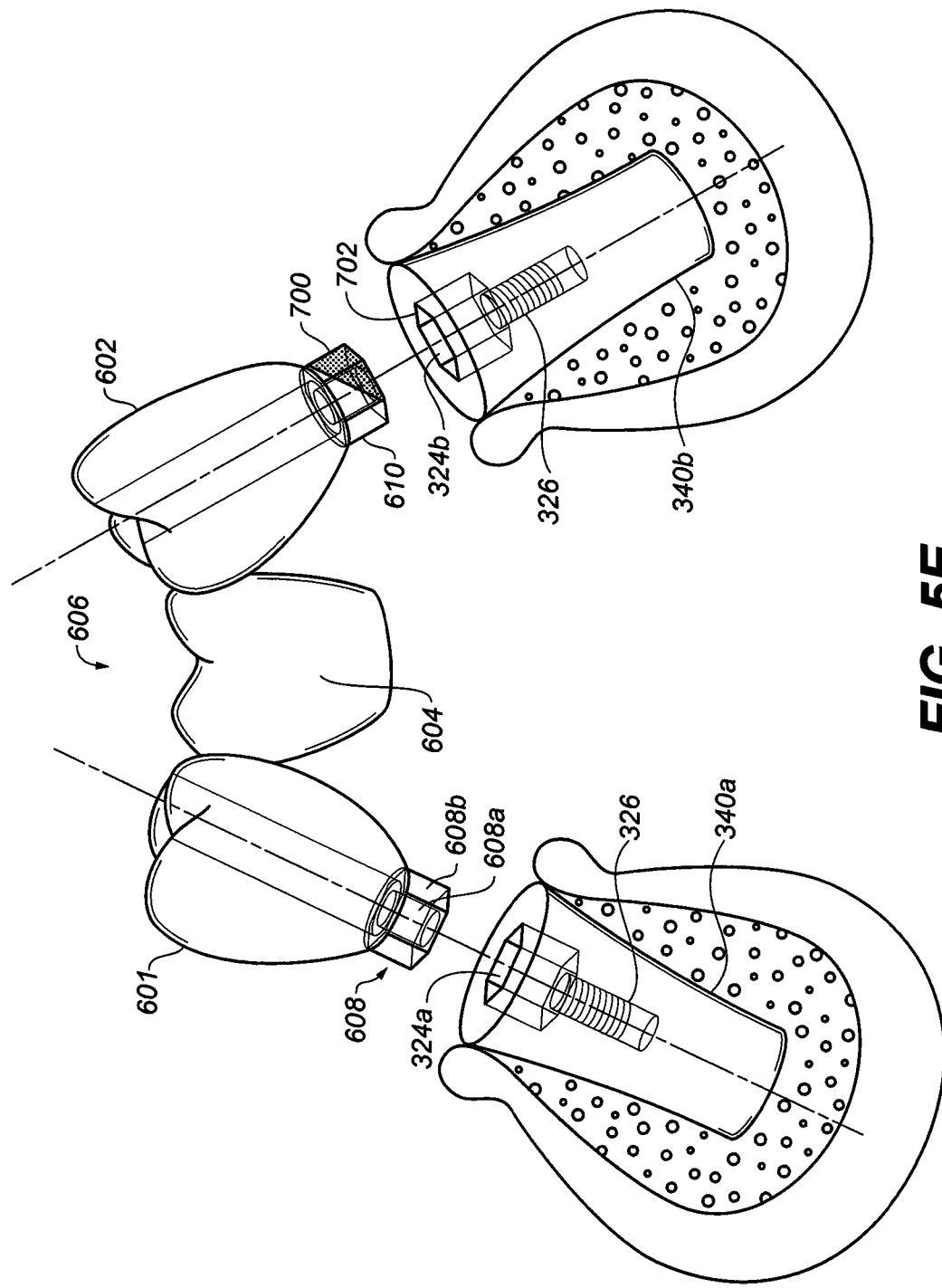
FIG. 5E is a perspective view of two dental implants of FIG. 3E with the abutment adaptor and abutment screw removed with the one-piece dental bridge with two protrusions only one being asymmetrical.

As shown in FIG. 5D the final dental bridge or prosthesis with two abutment adaptor proximal ends are ready to attach to the two dental implants. In step 212, based on the three dimensional map, at least a section 700 (see FIG. 5E) of a protrusion 610 is machined to produce a common path of insertion of the first and second protrusions 608, 610 into the recesses 324a, 324b of the first implant 340a and the second implant 340b. FIG. 5E shows the section 700 as incompatible with the recess and this section should be removed in order to create a common path of insertion for the one-piece dental prosthesis 606. The final dental bridge or prosthesis with two abutment adaptor proximal ends ready to attach to the two dental implants. A common path of insertion was achieved with the removal of one side of the abutment adaptor proximal hex end (obstruction) to allow the dental bridge to mechanically engage the two dental implants.

In the example of FIG. 5E, and in step 214, a first crown 601 is attached to a second crown 602 with a bridge 604 to form the dental prosthesis 606. An abutment is that portion of a dental prosthesis that removably connects to the implant and remains disposed above the patient's jawbone and gum line. The abutment can be incorporated into the prosthetic teeth itself or configured to receive a secondary prosthesis, such as custom or pre-formed denture crown 400 (see FIG. 6A). The secondary prosthesis may be attached to the abutment using, for example, dental cement. The first crown 601 and second crown 602 have respective first and second protrusions 608, 610 which have at least two adjacent flat-edged walls (e.g. 608a, 608b). The first and second protrusions 608, 610 extend below the bridge 604. In one embodiment, the first and second protrusions 608, 610 extend below the abutment for a length of about 1-30 mm so as not to interfere with transitional dentures. In the exemplary embodiment of FIG. 5E, there are six flat-edged walls that form hexagonal protrusions. In other embodiments, more or fewer flat-edged walls are provided. The flat-edged walls provide an indexing position, also referred to as a timed position, and permit the protrusions to be fixedly inserted into a corresponding recess while preventing the protrusions from rotating in the recess. For example, with six flat-edged walls present, six indexed positions are provided. The bridge 604 may be formed from any tooth-looking or tooth-functioning materials such as zirconia, porcelain, titanium, acrylic teeth forming materials, plastic, polymers, and laser consolidated processes.

In practice, the protrusions 608, 610 often do not perfectly align with the recesses 324a, 324b of the implant fixtures 340a, 340b after the bridge 604 is formed. Due to the presence of the bridge 604, one cannot simply re-orientate the angle of insertion. It is undesirable to individually place the implants in the jawbone and thereafter form the bridge as this is a time consuming and costly process. To obviate the need for such a step, the crowns 601, 602 and their corresponding protrusions 608, 610 may be machined from a prefabricated common piece. For example, in one embodiment, the prefabricated common piece may provide the same hexagonal protrusion on all such pieces. Then, after the bridge 604 has been formed, comparison of the prosthesis 606 to the digital map produced in step 208 informs the practitioner which sections of which protrusion should be removed to provide a common path of insertion. For example, and with reference to FIG. 5E, it can be determined from this digital map that a section 700 of the protrusion 610 is obstructing or incorrectly contacting section 702 of the recess 324b, thereby preventing the prosthesis 606 from being correctly fit with both implant fixtures 340a and 340b. The example depicted in FIG. 5E shows the protrusion 608 may have a cross section that is symmetrical. In the same embodiment, the protrusion 610 has a cross section that is asymmetrical by the absence of part of the protrusions 700.

In FIG. 5E the jawbone and implants are shown for illustrative purposes only. It should be noted that the practitioner can determine which sections to remove by machining based on the digital map and there is no need to engage in a time consuming and costly trial-and-error process chairside and intra-orally with the actual patient's jawbone. The disclosed method circumvents the need to fabricate intermediary components such as individual, separate parallel abutments, abutment screws and other custom components in order to establish a "common path of insertion" to allow insertion of the prosthesis into all recesses simultaneously. In step 214, once the protrusion has been machined, the prosthesis 606 may be properly inserted into recesses 324a, 324b of the patient's jawbone via a common path of insertion. Various attachment mechanisms may be used including dental cement and/or screw attachments.

Figure 5F:
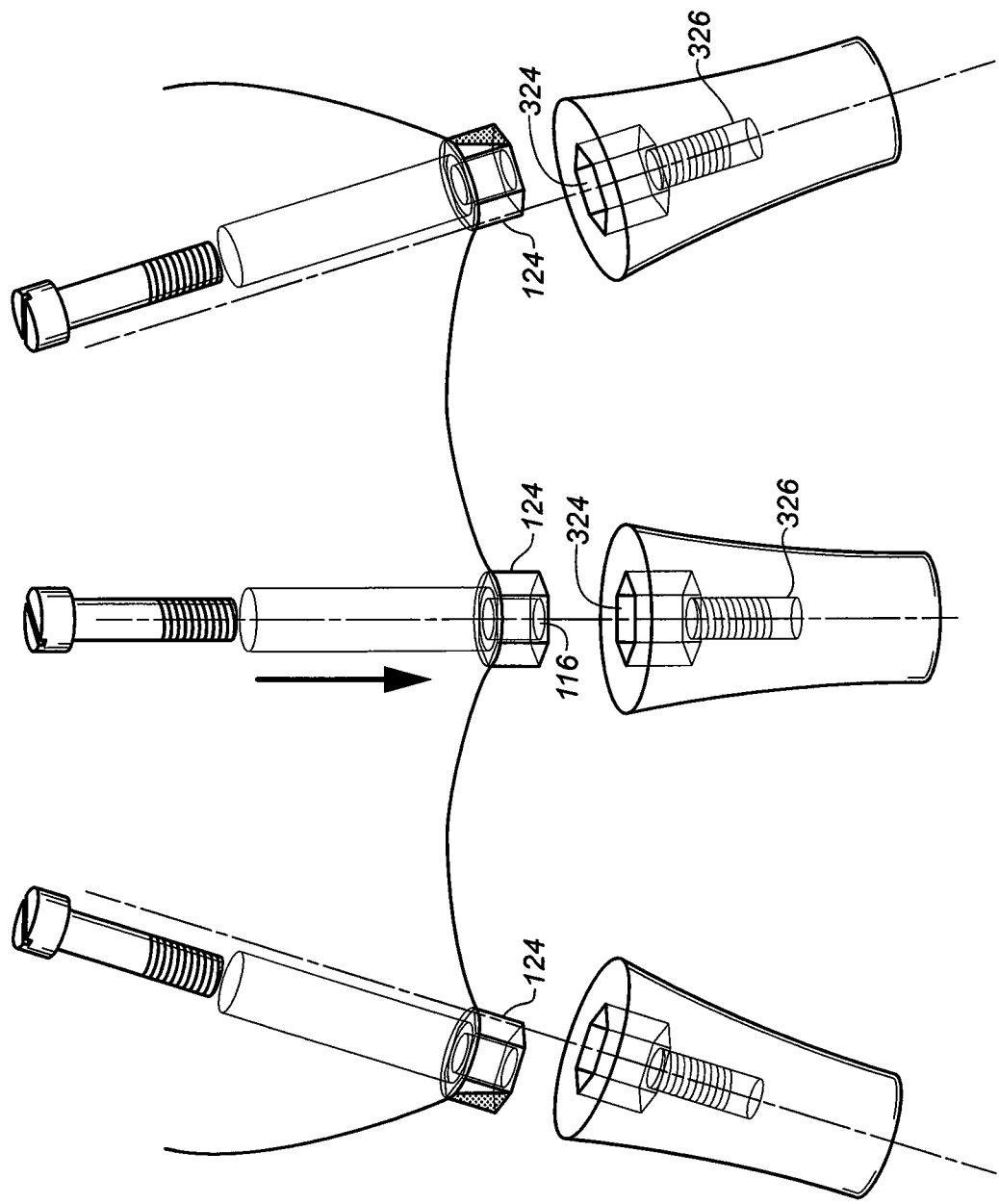
FIG. 5F is a perspective view of three dental implants of FIG. 3E with the abutment adaptor and abutment screw removed.

FIG. 5F further illustrates the concept with three implant assemblies in different trajectories. The center implant device is chosen as the path of insertion for the one-piece implant supported prosthesis. One side of both hex abutment adaptor protrusions are obstructing and required the removal of the outer side of both left and right protrusion to be able to insert into the three implant recess with different trajectories. The final dental bridge or prosthesis with three abutment proximal ends is ready to attach to the three dental implants with different trajectories. The middle implant is chosen as the common path of insertion of the one piece multiple implant/adaptor prosthesis for insertion into all three implants with the removal of one side of each of the two abutment adaptor proximal hex ends (obstruction).

Figure 6A:
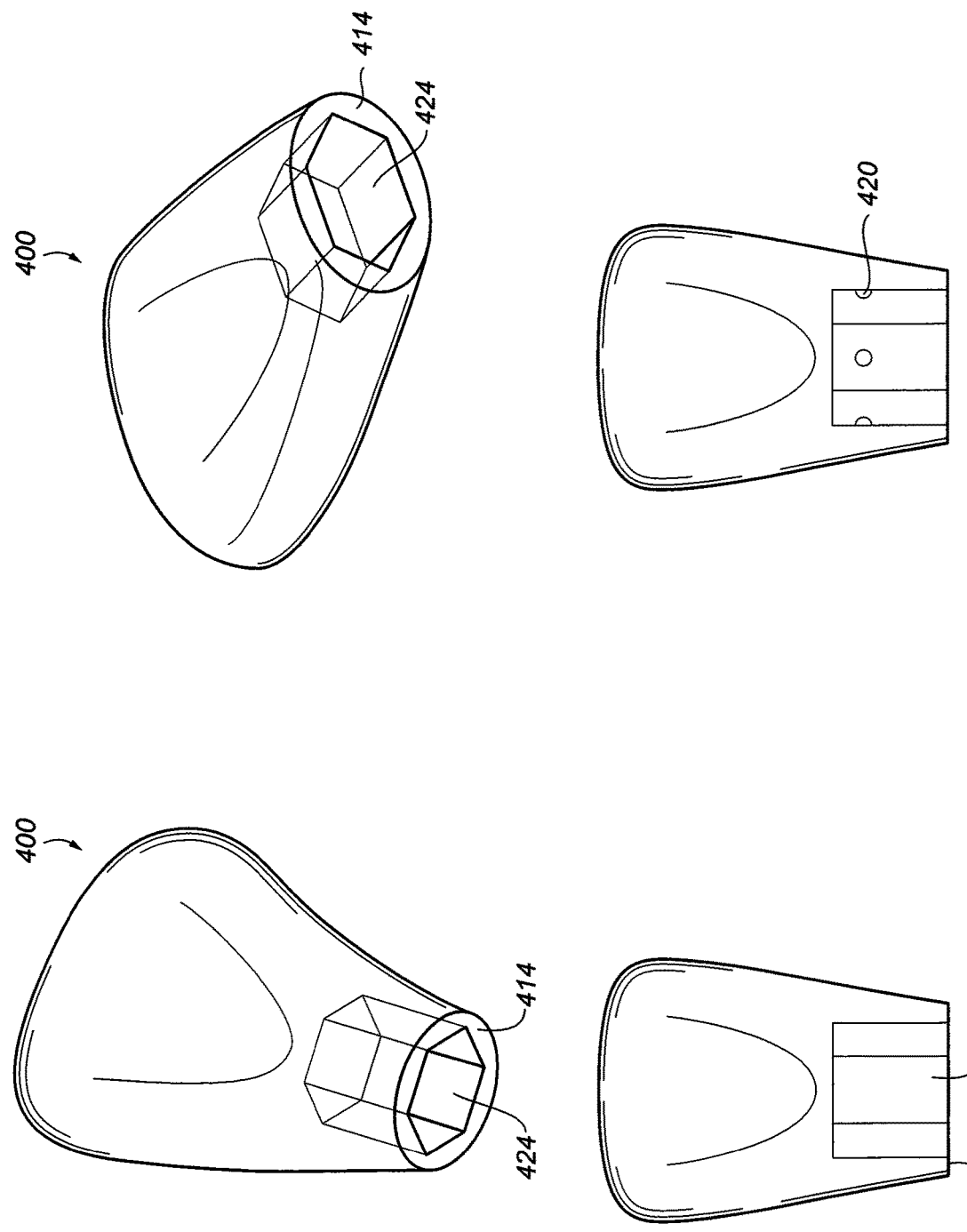
FIG. 6A is a perspective view of a preformed, stock denture tooth and the indexed hex recess.

FIG. 6A is perspective view of a preformed stock denture crown 400 with an indexed recess 424 on one end to allow engagement into a corresponding hex post. The ledge 414 formed at the end of the post can be used to support vertical biting forces. The material can be of composite, porcelain or any teeth like material similar in strength, color and texture. In another embodiment, indexed inserts 924 are provided that allow a mechanical interlocking of the pre-formed denture crown to the hex post with corresponding elevations.

FIG. 6B is another embodiment of pre-formed indexed denture crown or teeth set that has an expandable ring 432 for mechanical positive interlocking engagement to the indexed post with corresponding annular grove 430. In another embodiment, the indexed insert 420 can be chemically bonded to the recess of the pre-formed denture crowns.

Figure 7:
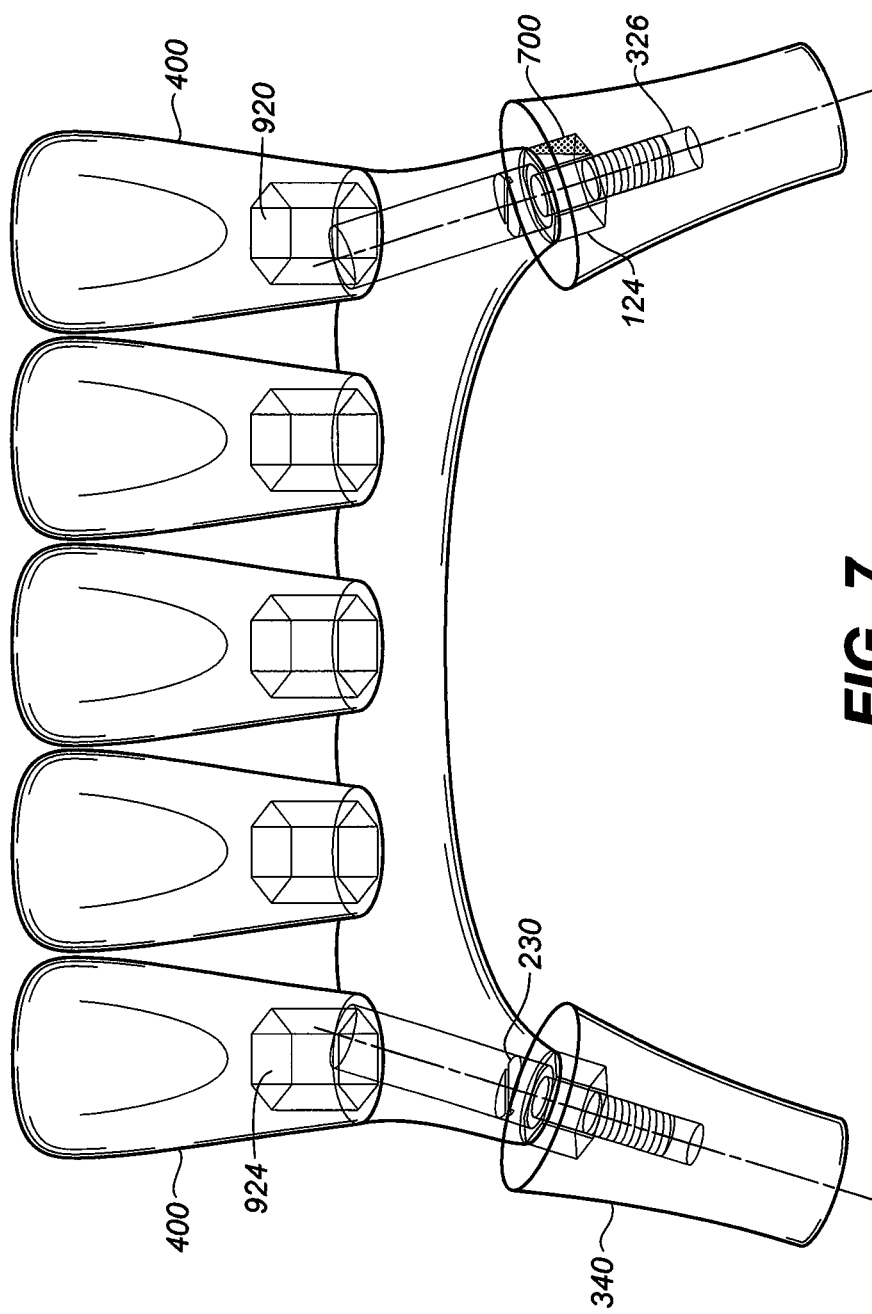
FIG. 7 is a perspective view of two dental implants of FIG. 3E with the abutment adaptor and abutment screw removed. The final dental bridge (or 5 teeth) or prosthesis with right one adjusted abutment adaptor proximal ends mechanically attached to the two dental implants with different trajectories. The left implant is chosen as the common path of Insertion, insertion of the one piece multiple implant/adaptor prosthesis can be inserted to both implants and mechanically retained with the removal of one side of the right abutment adaptor proximal hex end (obstruction)

FIG. 7 is an illustration of a one-piece five unit dental bridge or connector supported by two implant fixtures with different trajectories. The attachment of the indexed abutment protrusion by removal of section 700 was adjusted to allow insertion to indexed recess secured with abutment screws to the threaded orifice 326 for both implant fixtures. The prosthetic end has five indexed inserts 924 with their corresponding pre-formed stock denture crowns 400 attached chemically or mechanically.

The digital files of these stock preformed denture crowns set can be imported into the CAD implant/teeth library. Once the patient is satisfied with the teeth set up at the try-on procedure, the teeth arrangement can be scanned and related accurately to the implant fixtures for the fabrication of the implant teeth connector 900 (see FIG. 8C). After the connector 900 is engaged with all implant fixtures, then the set of pre-formed stock denture teeth can be attached to individual corresponding posts 920 or inserts 924 on the connector 900. In this fashion a common connector 900 provides indexed protrusions (e.g. protrusions 608, 610) that connect to universal abutment adaptors 10 to provide posts 920 for subsequent attachment of preformed stock crowns 400.

FIGS. 8A to 8D depict the execution of another exemplary method wherein the prosthesis is formed from pure grade V titanium. FIG. 8A depicts multiple implants after they have been installed into a patient's upper jawbone. Hexagonal recesses are depicted in the exemplary embodiment. In FIG. 8B a schematic depiction of the relative orientation of the various implants is shown with the longitudinal axes illustrated. A plurality of extensions 500 are also shown. In FIG. 8B, an optical intraoral scanner is used to digitally map the location of the abutment screw extensions 500 and the hexagonal abutment adaptor 10 and thereby determine the relative orientation of the various implant fixtures 340.

FIG. 8C depicts the internal recesses of all implant fixtures exposed by removal of the universal abutment adaptor 10 and abutment screw 230. An implant teeth connector 900 with properly adjusted protrusions 608, 610 (e.g. with section 700 removed) were ready to insert to all implant fixtures 340 with a common path of insertion. In another embodiment FIG. 8D depicts another implant teeth connector 920 where the teeth attachment are from inserts of hexagonal index inserts corresponding to preformed, stock denture teeth.

Figure 9:
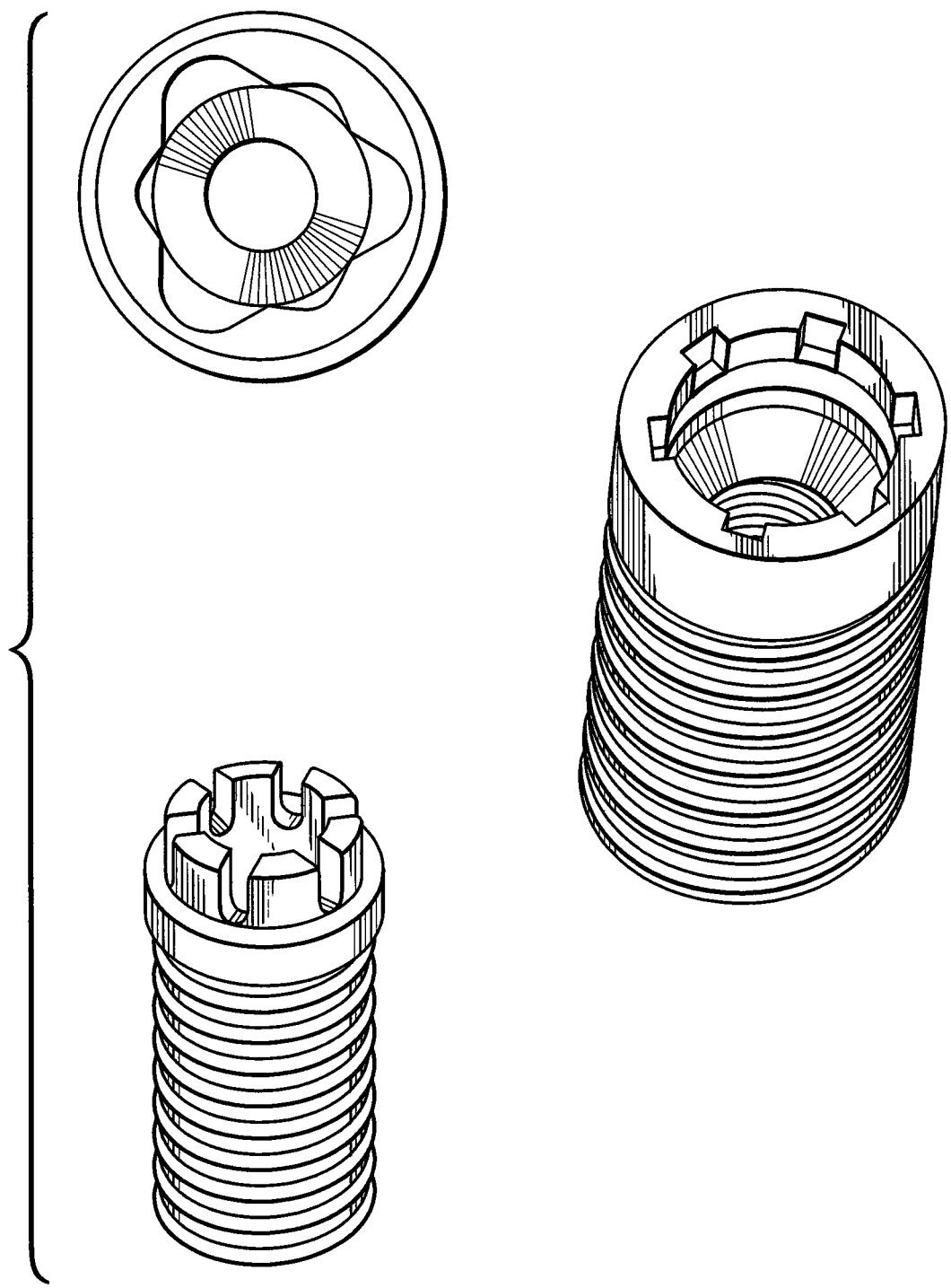
FIG. 9 depicts alternative embodiments of a dental implant recess.

In the embodiment of FIG. 9 the internal connection of the implant fixture is in the form of a spline.

Figure 10:
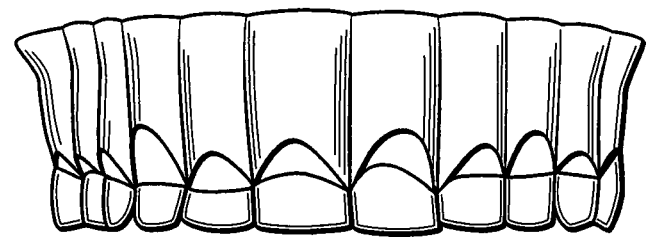
FIG. 10 shows the output of a digital map of the patient's mouth.
Figure 11:
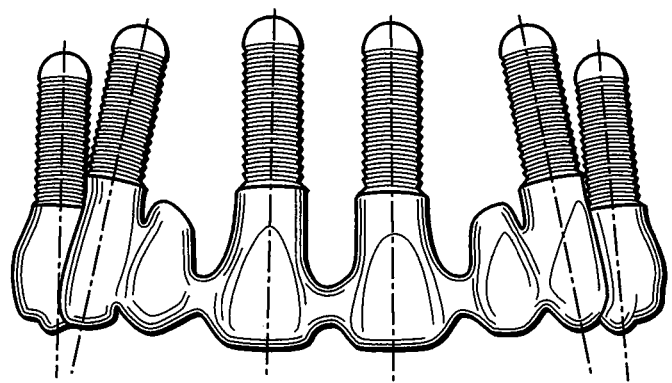
FIG. 11 depicts the map having been altered to remove the gums and show the relative orientation of the various implants as they extend into the jawbone.
Figure 12:
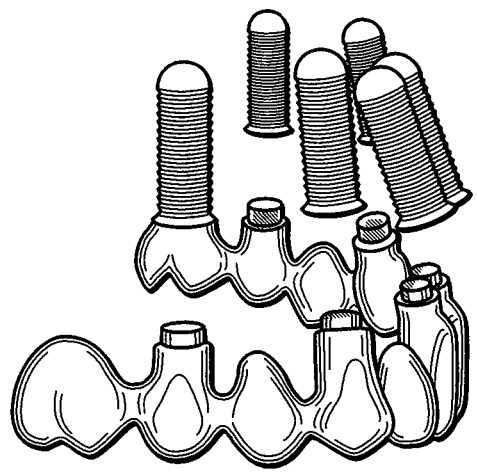
FIG. 12 illustrates which portions of the protrusions of the dental bridge protrusions must be machined to produce a common path of insertion.
Figure 13:
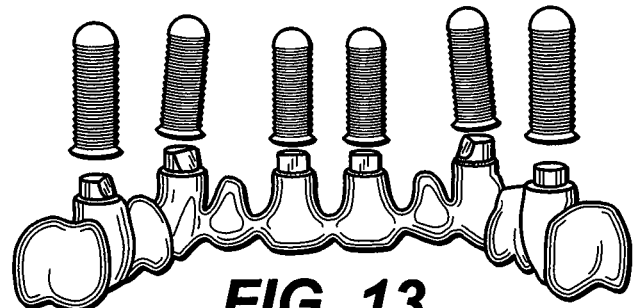
FIG. 13 depicts a prosthesis with appropriately machined protrusions.

An exemplary digital map is depicted in FIG. 10. FIG. 10 shows the output on a computer screen of a digital map of the patient's mouth. In FIG. 11, the map has been altered to remove the gums and show the relative orientation of the various implants as they extend into the jawbone. A digital bridge is also created in the computer using the un-machined protrusion geometries. In FIG. 12, the computer determines which portions of the protrusions must be machined to produce a common path of insertion. In FIG. 13 a prosthesis with appropriately machined protrusions is provided that has a common path of insertion into the implants. With a digital map of the prosthesis, an actual prosthesis may be formed using convention fabrication techniques, such as lathing. In one such embodiment, a common piece (e.g. a block of a given material) is lathed to produce a monolithic prosthesis.

One embodiment of the present invention also contemplates a method of forming a dental prosthetic comprising fixing a stud element in a predetermined site, placing a removable protective element on the stud element and forming a first impression over the protective element at the predetermined site. The method also includes removing the protective element from the stud element with the first impression, mounting an abutment in the protective element contained in the first impression, forming a second impression over the abutment such that the second impression substantially replicates the predetermined site, and creating prosthesis by relying on information provided by the second impression.

Another embodiment of the present invention contemplates a method of forming a dental prosthetic comprising providing a first impression which replicates a dental site, inserting a fixation element into the first impression, providing a second impression which replicates the dental site and retains the fixation element and modifying the fixation element on the second impression as needed so as to provide sufficient information to create the prosthetic.

Yet another embodiment of the present invention contemplates a model for creating a dental prosthetic comprising a form replicating the region of an edentulous space within a patient's mouth, the form having an analog abutment protruding from the region, and the analog abutment having a modification created to ensure insertability and removability of a prosthetic within a patient's mouth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for simultaneously installing multiple dental implants, the method comprising sequential steps of:
    forming a plurality of holes in a jawbone of a patient;
    attaching multiple dental assemblies to the jawbone, each dental assembly comprising:
        an abutment adaptor that is removably connected to an implant fixture by an abutment screw, the abutment adaptor comprising (1) an upper hexagonal portion with an upper width and a top bore for receiving the abutment screw and (2) a lower hexagonal protrusion with a lower width that is less than the upper width and a bottom bore for receiving the abutment screw and (3) an annular groove contiguous with the upper hexagonal portion and above the lower hexagonal protrusion; the attaching occurring such that the upper hexagonal portion is exposed above the implant fixture and the lower hexagonal protrusion is disposed within and contiguous with a hexagonal recessed wall of the implant fixture, thereby translating a spatial orientation of the hexagonal recessed wall to the upper hexagonal portion of the abutment adaptor;
    waiting for soft tissue around the plurality of holes to heal, wherein the upper hexagonal portion remains exposed above the soft tissue due to a height of the upper hexagonal portion;
    determining relative spatial orientations of each hexagonal recessed wall by intraorally scanning the upper hexagonal portion;
    fabricating a monolithic connector comprising one fabricated protrusion for each implant fixture, each fabricated protrusion fabricated to provide a common path of insertion into all hexagonal recessed walls of the implant fixtures;
    removing the abutment adaptor from each of the implant fixtures to reveal the hexagonal recessed wall;
    attaching the monolithic connector to the implant fixtures by inserting each fabricated protrusion into a respective hexagonal recessed wall of a respective implant fixture;
    selecting a number of preformed crowns from a predetermined inventory of available crowns;
    affixing the number of preformed crowns to a corresponding plurality of posts on the monolithic connector.

2. The method as recited in claim 1, wherein the step of determining relative spatial orientations of each of the implant fixtures comprises:
    securing an extension into an internal bore of the abutment screw of each implant fixture, the extension providing an elongated guide pin with a length of at least 5 mm, the elongated guide pin extending parallel to a longitudinal axis of the implant fixture;
    intraorally scanning all of the elongated guide pins and all of the upper hexagonal portions of each abutment adaptor;
    digitally producing a three-dimensional map of the implant fixtures based on the step of intraorally scanning.

3. The method as recited in claim 2, wherein the step of fabricating the monolithic connector fabricates the monolithic connector based on the three-dimensional map.

4. The method as recited in claim 3, wherein at least two fabricated protrusions have different external surface shapes.

5. The method as recited in claim 4, wherein the different external surface shapes are fabricated by removing sections of each fabricated protrusion.

6. The method as recited in claim 4, wherein the different external surface shapes are fabricated by creating the different external surface shapes using a computer-aided-drawing (CAD) software.

7. The method as recited in claim 2, wherein the internal bore of the abutment screw is a threaded internal bore.

8. The method as recited in claim 1, wherein the abutment adaptor comprises a rounded extension disposed between the upper hexagonal portion and the lower hexagonal protrusion.

9. The method as recited in claim 8, wherein the annular groove is contiguous with both the upper hexagonal portion and the rounded extension.

10. The method as recited in claim 9, wherein the rounded extension comprises parallel vertical sidewalls.

11. The method as recited in claim 9, wherein the rounded extension is cone shaped with vertical sidewalls that extend downward and inward.

12. The method as recited in claim 1, wherein the abutment adaptor comprises a rounded extension below the lower hexagonal protrusion, wherein the annular groove is contiguous with both the upper hexagonal portion and the lower hexagonal protrusion.

13. The method as recited in claim 1, wherein the annular groove has a depth between 0.1 mm and 5 mm.

14. The method as recited in claim 1, wherein a shouldered collar is disposed within the annular groove, such that the shouldered collar is disposed below the upper hexagonal portion and above the lower hexagonal protrusion.

* * * * *